US011475140B1

(12) United States Patent
Buonora

(10) Patent No.: US 11,475,140 B1
(45) Date of Patent: Oct. 18, 2022

(54) ENCLAVE-BASED CRYPTOGRAPHY SERVICES IN EDGE COMPUTING ENVIRONMENTS

(71) Applicant: Amazon Technologies, Inc., Seattle, WA (US)

(72) Inventor: Peter Buonora, Hopkinton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 147 days.

(21) Appl. No.: 17/103,533

(22) Filed: Nov. 24, 2020

(51) Int. Cl.
| | |
|---|---|
| *G06F 21/60* | (2013.01) |
| *G06F 8/60* | (2018.01) |
| *G06F 21/12* | (2013.01) |
| *G06F 21/44* | (2013.01) |
| *G06F 21/62* | (2013.01) |
| *H04L 9/32* | (2006.01) |

(52) U.S. Cl.
CPC ............. *G06F 21/602* (2013.01); *G06F 8/60* (2013.01); *G06F 21/12* (2013.01); *G06F 21/44* (2013.01); *G06F 21/62* (2013.01); *H04L 9/3226* (2013.01); *G06F 2221/0735* (2013.01); *G06F 2221/2149* (2013.01)

(58) Field of Classification Search
CPC .......... G06F 21/602; G06F 8/60; G06F 21/12; G06F 21/44; G06F 21/62; G06F 2221/0735; G06F 2221/2149; H04L 9/3226
See application file for complete search history.

(56) References Cited

U.S. PATENT DOCUMENTS

| | | | |
|---|---|---|---|
| 9,246,690 B1* | 1/2016 | Roth | G06F 21/53 |
| 10,044,695 B1* | 8/2018 | Cahill | H04L 63/08 |
| 10,116,440 B1* | 10/2018 | Rudzitis | H04L 9/0891 |
| 10,447,668 B1* | 10/2019 | Norum | H04L 9/3242 |
| 10,467,422 B1* | 11/2019 | Roth | G06F 21/602 |
| 11,113,424 B2* | 9/2021 | Pruss | H04L 9/0861 |
| 11,126,699 B2* | 9/2021 | Soriente | H04L 9/0897 |
| 2005/0210287 A1* | 9/2005 | Paatero | G06F 21/85 726/5 |
| 2007/0220500 A1* | 9/2007 | Saunier | G06F 21/575 717/162 |
| 2013/0152209 A1* | 6/2013 | Baumann | G06F 21/74 726/26 |
| 2014/0229729 A1* | 8/2014 | Roth | H04L 67/1097 713/153 |
| 2014/0230007 A1* | 8/2014 | Roth | G06F 21/602 726/1 |
| 2015/0058923 A1* | 2/2015 | Rajagopal | G06F 21/36 726/1 |
| 2015/0082048 A1* | 3/2015 | Ferguson | G06F 9/4401 713/189 |
| 2015/0121536 A1* | 4/2015 | Xing | G06F 21/53 726/26 |

(Continued)

*Primary Examiner* — Darren B Schwartz
(74) *Attorney, Agent, or Firm* — Davis Wright Tremaine LLP

(57) ABSTRACT

Systems and methods for providing cryptographic services. A cryptography service obtains a request to provision a computing device to perform cryptographic operations. The cryptography service generates executable code for a protected execution environment. The computing device obtains and executes the executable code. The computing device fulfills requests for cryptographic operations in the protected execution environment.

19 Claims, 13 Drawing Sheets

(56) References Cited

U.S. PATENT DOCUMENTS

| | | | |
|---|---|---|---|
| 2015/0193221 A1* | 7/2015 | Khan | H04L 67/34 713/176 |
| 2015/0358301 A1* | 12/2015 | Dalbehera | G06F 21/57 713/171 |
| 2016/0054989 A1* | 2/2016 | Diebolt | H04W 12/35 717/177 |
| 2016/0254904 A1* | 9/2016 | Hjelm | H04L 9/006 713/155 |
| 2016/0350561 A1* | 12/2016 | Poiesz | G06F 21/53 |
| 2018/0048464 A1* | 2/2018 | Lim | H04L 9/0866 |
| 2018/0210742 A1* | 7/2018 | Costa | H04L 9/0643 |
| 2018/0212769 A1* | 7/2018 | Novak | H04L 63/0442 |
| 2018/0212778 A1* | 7/2018 | Novak | H04L 63/062 |
| 2018/0219841 A1* | 8/2018 | Nadler | H04L 63/0428 |
| 2019/0140846 A1* | 5/2019 | Moore | H04L 9/14 |
| 2019/0340393 A1* | 11/2019 | Mo | G06F 21/554 |
| 2020/0028693 A1* | 1/2020 | Wu | H04L 9/3218 |
| 2020/0125772 A1* | 4/2020 | Volos | G06F 21/602 |
| 2020/0175179 A1* | 6/2020 | Iyer | G06F 21/602 |
| 2020/0202012 A1* | 6/2020 | Shanbhogue | H04L 9/0866 |
| 2020/0252207 A1* | 8/2020 | Hanel | H04L 9/0897 |
| 2020/0349252 A1* | 11/2020 | Yu | H04L 9/50 |
| 2021/0019166 A1* | 1/2021 | Kataria | H04L 63/0428 |
| 2021/0097528 A1* | 4/2021 | Wang | G06Q 20/3825 |

\* cited by examiner

US 11,475,140 B1

ENCLAVE-BASED CRYPTOGRAPHY SERVICES IN EDGE COMPUTING ENVIRONMENTS

BACKGROUND

Security for systems and data is important in modern computing systems and environments. Cryptographic keys can be used to maintain security for various systems and data. In some cases, cryptographic keys are securely stored on a computer server accessible that can be accessed by computer clients via a network such as the Internet. These cryptographic keys may be used to perform cryptographic operations such as encryption and decryption. However, performing cryptographic operations using cryptographic keys in environments with limited connectivity can be challenging. Cryptographic operations often require usage of secure cryptographic material, and in limited connectivity environments, secure access to cryptographic material can be limited. Maintaining cryptographic material in environments with limited connectivity to support use of cryptographic operations is complex and involves a significant amount of time and resources to ensure the security of the cryptographic material.

BRIEF DESCRIPTION OF THE DRAWINGS

Various techniques will be described with reference to the drawings, in which.

DETAILED DESCRIPTION

Figure 1:
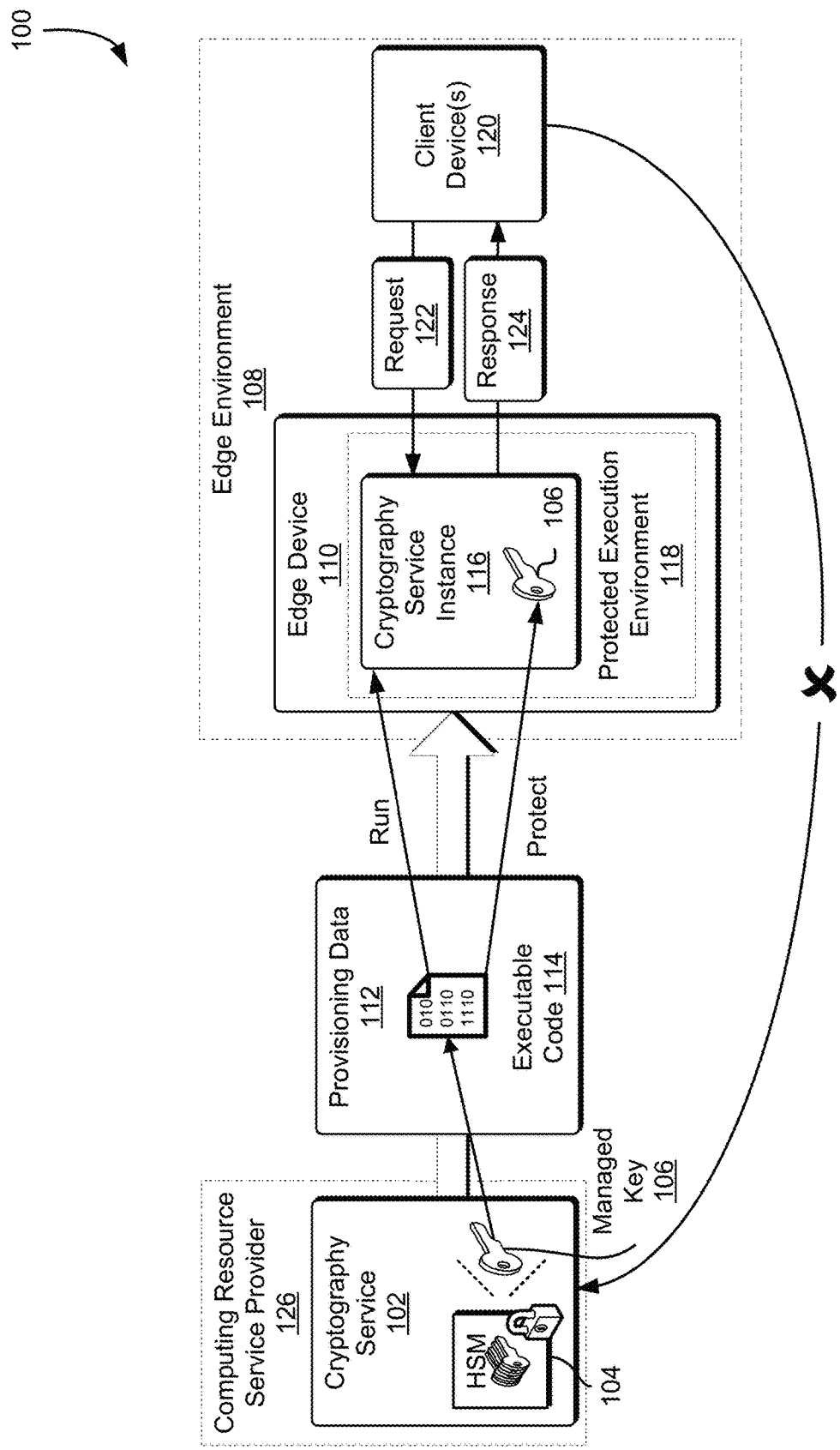
FIG. 1 shows an illustrative example of a computing environment in which a device obtains code to provision a protected execution environment comprising a cryptography service instance.

Techniques described herein include systems and methods to provide cryptographic services in limited connectivity environments using protected execution environments of an edge device. In various embodiments, a computing resource service provider operates a cryptography service (which can be referred to as a key management service or "KMS") that manages cryptographic keys and performs cryptographic operations using the cryptographic keys on behalf of clients of the computing resource service provider. Cryptography services can be utilized to provide web service interfaces to which requests can be submitted by clients via client computing devices to cause cryptographic operations to be performed. For example, a cryptography service can be used to encrypt and/or decrypt various forms of data. A cryptography service can provide executable code to an edge device that, when executed by the edge device, causes the edge device to provision a cryptography service instance within a protected execution environment. A protected execution environment may be implemented as an enclave that protects access to cryptographic keys such that cryptographic keys resident to the enclave are designed to never be exposed outside of the enclave in a plaintext format. Data resident to a protected execution environment may be protected such that there are cryptographically verifiable assurances that the data is kept confidential, even from privileged components such as virtual machine managers (VMM), kernels, Basic Input/Output System (BIOS) firmware, and operating systems (OS). A cryptography service instance provisioned within an edge device may "stand in" for a cryptography service of a computing resource service provider and be used to fulfill requests to perform cryptographic operations, such as in cases where the computing resource service provider is not available. A protected execution environment of the edge device can be usable by other client computing devices to perform various cryptographic operations without requiring the edge device to have the ability to connect with or maintain a connection with the cryptography service of the computing resource service provider.

An edge device may refer to a computer system operating in an edge computing environment, and may be provisioned to run a cryptography service instance within a protected environment. The cryptography service instance may be utilized to perform cryptographic operations such as encryption and decryption using cryptographic keys resident to the protected execution environment, which prevents the cryptographic keys from being accessed outside of the protected execution environment. For example, a cryptography service instance may be executed within the context of an enclave, and cryptographic keys used for cryptographic operations may be stored as secure enclave data that cannot be accessed outside of the enclave, even by the operating system of the edge device. In various embodiments, the edge device is used by one or more clients within an edge computing environment to fulfill cryptographic requests. Clients that use the edge device may benefit from improved network latencies, network throughput, availability, etc., as compared with using a computing resource service provider that may incur greater latencies due to the servers of the computing resource service provider being located a greater physical distance from the client. In some cases, clients may always have access to the edge device but not necessarily have access to the computing resource service provider.

In at least one example, a client refers to a computer system with memory storing executable instructions that, when executed by one or more processors of the computer system, is used to establish a client-server relationship with the computing resource service provider through one or more networks. The client may submit various requests to the computing resource service provider for operations to be performed by the computing resource service provider. The client may operate in a limited connectivity environment, such as an edge environment, where connectivity to a central server may be limited or may be inadequate for the computing needs of the client. The client may submit cryptographic requests to an edge device, which may be any suitable computing device operating in the edge environment. The edge device may provide cryptographic services to other devices operating in the edge computing environment in various cases, including when network connections to the cryptography service of the computing resource service provider are unavailable.

As part of a provisioning process, a client may submit a request to a cryptography service of a computing resource service provider, the request encoding one or more cryptographic keys that should be supported by a cryptography service instance. In an embodiment, the client that submits a request for a cryptography service instance is an administrative device that is not necessarily operating in an edge environment. The client may be an administrator of the cryptography service instance. The client may be operating in an environment different than an edge environment, and may administer various cryptography service instances to various edge devices in the edge environment. The cryptography service of the computing resource service provider may perform one or more authentication and/or authorization checks to ensure that the request should be fulfilled, and upon successfully validating that the request should be fulfilled, generate provisioning data for the client. Generating provisioning data may include generating enclave code that securely runs in a protected execution environment and has access to enclave data, which is protected by the enclave. For example, the computing resource service provider may create an enclave with entry points that allow untrusted code to invoke the enclave to perform various cryptographic operations using the aforementioned one or more cryptographic keys, which are securely stored as enclave data. In some cases, one enclave is created for each cryptographic key such that the enclave for one cryptographic key does not have access any of the other cryptographic keys. The untrusted code may include code for determining how to route cryptographic requests to the appropriate enclave—for example, the routing service may receive a cryptographic request, extract the key identifier of the request, and then invoke an entry point to perform the cryptographic operation using the specified key identifier.

The client may add additional cryptographic keys to perform cryptographic operations on the edge device. In some examples, the cryptographic keys may require updates as a result of a key rotation by the cryptography service of the computing resource service provider or other key update process. The client may obtain additional executable code from the cryptography service of the computing resource service provider that indicates additional cryptographic keys, which may be updated cryptographic keys corresponding to the cryptographic keys. The client may cause the edge device to execute the additional executable code, in which the edge device may provision an additional protected execution environment for performing cryptographic operations using the additional cryptographic keys. The other devices of the limited connectivity environment may then submit requests for cryptographic operations to be performed using the cryptographic keys or the additional cryptographic keys to the edge device, in which the cryptographic operations may be performed in either the protected execution environment or the additional protected execution environment of the edge device. The protected execution environment may be usable in addition to, or in place of, the additional protected execution environment.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: providing an ability to perform secure cryptographic operations in environments with limited network connectivity by providing executable code usable by devices operating in the environments with limited network connectivity to provide secure cryptography services in which the secure cryptographic operations can be performed; improving performance of secure cryptographic operations by providing devices of environments with abilities to perform the secure cryptographic operations using devices local to the environments; and improving security of cryptographic operations performed in environments with limited network connectivity by providing devices of the environments with limited network connectivity with abilities to perform the cryptographic operations in protected execution environments, as well as various other advantages.

FIG. 1 shows an illustrative example of a computing environment 100 in which a device obtains code to provision a protected execution environment comprising a cryptography service instance. In the computing environment 100, a cryptography service 102 may be a service implemented in the context of a computing resource service provider 126, and may be accessible through a global computer network, such as the Internet. A cryptography service 102 may include a network of one or more devices, such as a hardware security module (HSM) 104, a trusted platform module (TPM), a cryptographic processor, and/or variations thereof.

In an embodiment, a cryptography service 102 is a collection of computing resources collectively configured to manage and use cryptographic keys for clients of the computing resource service provider 126. Cryptographic keys used by a cryptography service 102 may have associated identifiers that clients can reference when submitting requests to perform cryptographic operations (such as encryption, decryption, and message signing) and/or other operations, such as key rotation. Cryptography service 102 may securely maintain cryptographic keys in HSM 104 to avoid access by unauthorized parties. Cryptography service 102 may provide encryption keys, such as a data key (DK), which may be encrypted using a managed key (MK), contained within the cryptography service 102. An encryption key may be a type of cryptographic key, which, in an embodiment, is a key suitable for use in a cryptographic algorithm (e.g., encryption algorithm, decryption algorithm, digital signature algorithm) that cryptographically protects an aspect of data, such as by providing cryptographically verifiable assurances of confidentiality, integrity, and/or authenticity of the data. Authenticity may refer to cryptographically verifiable assurances that a message was created by a party purporting to be the author of the message. Integrity may refer to cryptographically verifiable assurances that a received message was not modified either intentionally (e.g., by a malicious party) or unintentionally (e.g., as a result of signal loss during transmission) from its original form when the message was transmitted. Confidentiality may refer to cryptographically verifiable assurances that the message may only be understood by the recipient and/or other intended parties (e.g., by transmitting an encrypted message that may only be decrypted using a secret key that is accessible to recipient). Managed keys may be cryptographic keys that are maintained by a cryptography service 102 on behalf of one or more clients, and never exported from the cryptography service 102 in plaintext form. In various embodiments, a cryptographic key may be referred to as a key, cryptography key, cryptographic operation key, cryptographic secret, cryptographic material and/or variations thereof.

Clients may communicate to cryptography service 102 via application programming interface (API) requests, which may be web service API requests. Clients may utilize cryptographically protected communications sessions to communicate to a cryptography service 102. Clients may submit appropriately configured API requests to a cryptography service 102 through one or more web service interfaces. An API request may be considered to be appropriately configured if it is formatted sufficiently and contains information (e.g., authentication information such as a digital signature or other credential or information generated from a credential) sufficient to cause a receiving system to fulfill the request. Generally, it should be understood that unless explicitly contradicted or otherwise clear from context, the movement of data, and interactions, from one system to another can be performed in any suitable manner, such as in a single transmission, by streaming (e.g., by transmitting the data in pieces over multiple transmissions), or otherwise.

In at least one embodiment, cryptography service 102 is used to process and fulfill web service API requests related to cryptographic operations. For example, cryptography service 102 may support one or more of the following APIs:

CreateKey(KeyID)
Encrypt(KeyID, Data, [AAD])
Decrypt(KeyID, Ciphertext, [AAD])
GenerateDataKey(KeyID)

A CreateKey(KeyID) request, in an embodiment, refers to a web service API request that is used to create a key. In at least one embodiment, CreateKey( ) API is used to create a cryptographic key identified by a key identifier specified in the request. Alternative embodiments may designate the name of the request performing the CreateKey(KeyID) functionality as create(KeyID), key(KeyID), and/or variations thereof. Upon receipt of a request, a cryptography service 102 may generate a key and associate the key with the KeyID. It should be known that KeyID's may be, but are not necessarily unique identifiers. For instance, a KeyID may identify a family of keys. It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables a cryptography service 102 to detect that the ciphertext was not generated based at least in part on the key, such as by using authenticated encryption. Other variations are also considered as being within the scope of the present disclosure.

An Encrypt(KeyID, Data, [AAD]) request may be used to cause a cryptography service 102 to encrypt the specified data using a key identified by the KeyID, which may refer to an identifier that uniquely resolves to a particular managed key. Additional Authenticated Data (AAD) may be used for various purposes and may be data that is not necessarily encrypted, but that is authenticated, e.g., by an electronic signature, a message authentication code or, generally, a keyed hash value included with the AAD. The AAD may be an optional field, as denoted by the brackets. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, access control policy (referred to simply as "policy") may constrain whether a cryptographic operation can be performed with respect to particular AAD. Processing of Encrypt(KeyID, Data, [AAD]) requests may require, by programming logic and/or policy enforced by a cryptography service 102, both that the AAD contain particular values and that the AAD be authentic (e.g., not modified since original transmission). Similarly, a Decrypt(KeyID, Ciphertext, [AAD]) request may be used to cause a cryptography service 102 to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by a cryptography service 102, both that the AAD contain particular values and that the AAD be authentic (e.g., not modified since original transmission).

A GenerateDataKey(KeyID) request may be used to cause a cryptography service 102 to generate an encrypted data key using a key identified by the KeyID. Alternative embodiments may designate the name of the request performing the GenerateDataKey(KeyID) functionality as get (KeyID), getKey(KeyID), and/or variations thereof. Upon receipt of a request, a cryptography service 102 may generate a key and encrypt the generated key using a key specified by the KeyID. In some embodiments, the request may generate a plaintext data key and the corresponding ciphertext copy of the data key, encrypted by the key identified by the KeyID.

In at least one embodiment, cryptography service 102 is utilized to provision an edge device with cryptographic keys that can be used to fulfill client requests to perform cryptographic operations. In at least one embodiment, cryptography service 102 receives a provisioning request from a client to establish itself as a cryptography service instance. The request may identify one or more cryptographic keys that should be supported by the cryptography service instance and may be encoded in the request in any suitable manner, such as in the form of a list of resource names or key identifiers. Upon receipt of a request for executable code, a cryptography service 102 may generate executable code for provisioning a protected execution environment comprising a cryptography service instance that can perform cryptographic operations using one or more cryptographic keys specified by the request, and provide the executable code in response to the request.

In at least one embodiment, cryptography service 102 creates an enclave by generating executable code that securely stores one or more cryptographic keys as enclave data and exposes one or more entry points that can be invoked to perform one or more cryptographic requests using the cryptographic keys resident to the enclave. Cryptography service may generate executable code by obtaining one or more keys identified in a provisioning request. In some embodiments, a request indicates one or more identifiers of keys, in which cryptography service 102 obtain one or more keys from one or more secure devices, such as HSM 104. In at least one embodiment, a cryptography service 102 obtains one or more encrypted keys out-of-band or separate from the provisioning request—for example, an edge device may create, select, or otherwise determine one or more keys to be supported by a cryptography service instance, encrypt the one or more keys using a secret that is accessible to the cryptography service 102, and then transmit the encrypted one or more keys to the cryptography service 102. The cryptography service 102 may then decrypt the encrypted one or more keys to obtain the one or more keys and then creates an enclave using the one or more keys that were provided by the edge device. In some examples, encrypted one or more keys are encrypted with a public key of a cryptography service 102, in which a cryptography service 102 may decrypt the one or more encrypted keys using a private key of a cryptography service 102. In some examples, one or more encrypted keys are be encrypted with a symmetric key, which may be obtained through one or more key exchange processes with a computing device, in which a cryptography service 102 may decrypt the one or more encrypted keys using the symmetric key.

A cryptography service 102 may generate executable code based at least in part on one or more keys. A cryptography service 102 may obtain one or more keys and generate code for an enclave that stores the one or more keys as enclave data within the enclave. Code for an enclave may be generated such that keys resident to the enclave may be protected by the enclave and never exported from the enclave in plaintext format. Data, such as executable code or keys, stored within an enclave may be inaccessible outside of the enclave environment within an edge device, including to privileged components of the edge device such as VMMs, kernels, BIOS firmware, and OS software. A cryptography service 102 may generate code for a set of enclave entry points, which may be a set of functions that provide access to an enclave. A cryptography service 102 may generate code that encodes a set of trusted functions that may pass data to or obtain data from an enclave. A cryptography service 102 may determine one or more cryptographic processes, operations, and functions that an edge device may perform using one or more keys, and generate code for a cryptography service instance that may be used to perform the one or more cryptographic processes, operations, and functions using the one or more keys. Code for a cryptography service instance may encode various instructions, processes, and functions for performing cryptographic operations using one or more keys. For example, code for a cryptography service instance comprises instructions to perform an encryption operation using a cryptographic key. A cryptography service 102 may generate code for a cryptography service instance as enclave code that is stored and run within an enclave. A cryptography service 102 may generate code for a routing service that may execute outside of an enclave and route data into the enclave where cryptographic operations may be performed. A cryptography service 102 may encode various logic, functions, and other processes in code for a routing service that may route requests for cryptographic operations to an enclave where the cryptographic operations can be performed using code within the enclave.

A cryptography service 102 may generate a first portion of the executable code, which may be referred to as trusted code, that when executed, provisions a protected execution environment comprising a cryptography service instance that may perform various cryptographic processes, operations, and functions using one or more keys. A cryptography service 102 may generate a second portion of the executable code, which may be referred to as untrusted code, that when executed, instantiates a routing service, which may be a software application or program that may provide access to a protected execution environment as well as cause a cryptography service instance to perform various cryptographic processes, operations, and functions using one or more keys. A cryptography service 102 may transmit executable code to an edge device in response to a provisioning request from the edge device through one or more networks, which may be cryptographically secured (e.g., communications between the one or more networks may be encrypted).

A hardware security module, such as HSM 104 illustrated in FIG. 1, may refer to a physical computing device that safeguards cryptographic keys by storing them within a tamper-resistant physical device. In some examples, an HSM provides cryptographic key generation and storage, and performs cryptographic operations for authorized clients of the HSM. In some embodiments, cryptographic keys that are stored in a HSM are not exposed in a plaintext format outside of the HSM. An HSM may comprise one or more processors that may prevent tampering and unauthorized access to data of the HSM. An HSM may delete cryptographic keys stored in the HSM upon detection of tampering of or unauthorized access to data of the HSM.

Managed key 106 may refer to any suitable cryptographic key, such as a symmetric key or private key of an asymmetric key pair. In some embodiments, managed key 106 is a cryptographic key associated with a particular client of a computing resource service provider and used to perform various cryptographic operations such as encryption and decryption. A data key may be generated and used to encrypt data; the data key may be encrypted by a managed key 106 and the plaintext data key may be discarded or otherwise deleted. The encrypted data may be decrypted by first decrypting the data key with the managed key 106, and using the decrypted data key to decrypt the encrypted data.

An edge environment 108, which may be referred to as an edge computing environment, may refer to a computing environment in which connectivity to one or more global networks, such as the Internet, is limited. Within an edge environment 108, connectivity to the Internet may be sporadic, scheduled, or not available in any capacity. An edge environment 108 may refer to a computing environment in which connectivity to one or more global networks, such as the Internet, is available, but connectivity to local area networks of the computing environment may have lower latency, higher reliability, and/or higher available bandwidth. Within an edge environment 108, connectivity to an edge device 110 may have lower latency, higher reliability, and/or higher available bandwidth than connectivity to the Internet. An edge device 110 operating in an edge environment 108 may provide cryptography services that may be accessible to devices operating in the edge environment 108; networks used to provide the cryptography services from the edge device 110 may have lower latency than networks that may be used to access web cryptographic services (e.g., cryptography service 102) of a computing resource service provider.

In at least one embodiment, edge device 110 submits a provisioning request to cryptography service 102 requesting to create a cryptography service instance for managed key 106. Managed key 106 may be a cryptographic key managed by cryptography service 102 on behalf of the edge device 106 or a downstream client of the edge device 106 such as client device(s) 120. A provisioning request may comprise an identifier of managed key 106. In some examples, a request for executable code may comprise an encrypted version of managed key 106. A client may submit a request via one or more computing devices such as edge device 110. The request may be submitted through communications that may be orchestrated by a browser or other application executing on the one or more computing devices.

An edge device 110 may be any suitable computing device such as a computer, computing system, server system, mobile computing device, and/or variations thereof. Edge device 110 may include one or more processors, and memory storing instructions executable by the one or more processors. Edge device 110 may be a network-attachable data transfer device such as those described in connection with FIG. 8. Edge device 110 may refer to a computing device operating in an edge environment 108. An edge environment 108 may refer to any environment in which connectivity to one or more global computer networks, such as the Internet, is limited. An edge environment 108 may be an environment such as those encountered in various shipping/transit contexts, factory contexts, mining contexts, military contexts, and industrial contexts. Internet connectivity in edge environment 108 may be sporadic (e.g., Internet access may only be available at irregular times/locations), scheduled (e.g., Internet access may only be available at scheduled times/locations), or unavailable (e.g., Internet access may not be available at any time/location). Edge environment 108 may be an environment in which only access to local networks is available and access to global networks or other wide area networks is only available in a limited capacity.

In at least one embodiment, edge device 110 submits a provisioning request to cryptography service 102 to provisioning and run a cryptography service instance that supports one or more cryptographic keys and, in response to the request, receives executable code 114 that the edge device 110 can run to provision one or more enclaves that securely store, access, and fulfill cryptographic requests using the one or more cryptographic keys. Executable code 114 may be generated by a cryptography service 102 using the managed key 106, for example, in accordance with techniques discussed in greater detail below and in connection with FIG. 11. A cryptography service 102 may provide provisioning data 112 in response to the request to an edge device 110. In some examples, a client submits a request via a different computing device and causes provisioning data 112 to be provided to an edge device 110 by indicating in the request a location (e.g., network location) of the edge device 110, in which a cryptography service 102 obtains the request, generates the provisioning data 112, and provides the provisioning data 112 to the edge device 110 using the indicated location (e.g., by transmitting the provisioning data 112 to the location). Provisioning data 112 may be provided to an edge device 110 from a cryptography service 102 through one or more networks, which may be cryptographically secured (e.g., communications between the one or more networks may be encrypted). In some embodiments, an edge device 110 may be provided physically to a cryptography service 102 (e.g., shipped to a physical data center location of the cryptography service 102) in which provisioning data 112 may be transferred locally to the edge device 110, and the edge device 110 may be physically returned to the edge environment 108 (e.g., shipped from the physical data center location to the edge environment 108).

In at least one embodiment, provisioning data 112 refers to a collection of data that is used by edge device 110 to provision a protected execution environment. Provisioning data 112 may be a data structure that comprises executable code, encrypted data (e.g., encrypted cryptographic keys), and other data associated with the executable code and the encrypted data (e.g., identifiers, metadata, digital signatures). In at least one embodiment, provisioning data 112 comprises executable code 114. The executable code 114 may comprise instructions that, when executed by a device such as edge device 110, causes the device to provision a protected execution environment comprising a cryptography service instance that can perform cryptographic operations with a managed key 106. Executable code 114 may encode or otherwise comprise one or more cryptographic keys. Executable code 114 may comprise the managed key 106. Managed key 106 may be encrypted within the executable code 114. In some examples, provisioning data 112 may include the executable code 114 and the managed key 106, which may be encrypted, separately.

In some embodiments, provisioning data 112 comprises cryptographic material such as a digital signature that proves a cryptographically verifiable attestation that the executable code 114 was generated by or on behalf of the cryptography service 102. The cryptographic material may verify the authenticity of the provisioning data 112 and the executable code 114. Edge device 110 may obtain cryptographic material and perform one or more processes to verify the authenticity of the provisioning data 112 and ensure the provisioning data 112 has not been modified or otherwise altered in transmission from a cryptography service 102 of the computing resource service provider 126. In some embodiments, cryptographic material comprises ciphertext of the provisioning data 112 generated using a private key of a cryptography service 102, in which an edge device 110 may validate the provisioning data 112 by decrypting the ciphertext using a public key of a cryptography service 102, and ensuring that the decrypted ciphertext matches the provisioning data 112. In some embodiments, provisioning data 112 includes a cryptographically verification attestation that the executable code 114 was created by a certain entity (e.g., cryptography service 102 or the organization that manages the cryptography service 102) and the edge device 110 verifies the authenticity and/or integrity of such an attestation. Example of cryptographically verifiable attestations may include, without limitation: digital signatures, MAC tags, message digests, and more Edge device 110 may obtain the provisioning data 112 and run or otherwise execute the executable code 114. The executable code 114, upon execution, may cause an edge device 110 to provision a protected execution environment 118 within the edge device 110. A protected execution environment 118 may be a protected area in memory address space of an edge device 110, and data of the protected execution environment 118 may only be accessible through one or more entry points. In some examples, a protected execution environment 118 may be running on one or more virtual hosts of an edge device 110. A virtual host of an edge device 110 may refer to a grouping of one or more computing resources of an edge device 110, and may have an associated identifier such as a network location, address, or other identifier. Managed key 106 may be protected within the protected execution environment 118 such that it may only be accessible in an edge device 110 in the protected execution environment 118. Further information regarding an enclave can be found in the description of FIG. 7.

Edge device 110 may execute the executable code 114 to instantiate or otherwise run a cryptography service instance 116 in the protected execution environment 118. Cryptography service instance 116 may be a software application or program that provides various cryptographic services. Cryptography service instance 116 may comprise or implement one or more functions that perform various cryptographic operations. Cryptography service instance 116 may perform cryptographic operations using the managed key 106, which may be protected within the protected execution environment 118. In some examples, cryptography service instance 116 may comprise the managed key 106, or be separate from the managed key 106 in the protected execution environment 118. Cryptography service instance 116 may be able to perform various cryptographic operations that may be performed by a cryptography service 102 of the computing resource service provider 126. Cryptography service instance 116 may support fulfillment of requests such as a CreateKey request, Encrypt request, Decrypt request, and GenerateDataKey request as described above. Cryptography service instance 116 may support encryption requests, decryption requests, cryptographic key generation requests, and the like. Cryptography service instance 116 may support any number of cryptographic operations that may be supported by a cryptography service 102.

Client device(s) 120 may be one or more computing devices operated by clients in the edge environment 108. Client device(s) 120 may be associated with the managed key 106. In some embodiments, clients operating the client device(s) 120 may have ownership of the managed key 106 such that a cryptography service 102 manages the managed key 106 on behalf of the clients. Clients may have caused a cryptography service 102 to obtain/generate, and manage the managed key 106 on behalf of the clients through one or more requests to the cryptography service 102. Client device (s) 120 may not have access to one or more global computer networks such as the Internet and may only have access to networks local to the edge environment 108. Client device (s) 120 may not have access to a cryptography service 102 of the computing resource service provider 126 through any networks. Client device(s) 120 may have access to an edge device 110 through various networks local to the edge environment 108, such as a local area network. Client device(s) 120 may interact with an edge device 110 through one or more local area networks. Client device(s) 120 may submit cryptographic requests and the cryptography service instance 116 may be used for processing the cryptographic requests. Client device(s) 120 may submit a request 122 indicating a cryptographic operation to be performed to an edge device 110, in which an edge device 110 may route the request 122 to the cryptography service instance 116 operating in the protected execution environment 118. Cryptography service instance 116 may perform a cryptographic operation indicated in request 122, and provide a response 124 indicating results of the cryptographic operation to the client device(s) 120 in response to the request 122. Results of a cryptographic operation may be provided from protected execution environment 118, and transmitted as response 124 from an edge device 110 to client device(s) 120 through one or more network interfaces of the edge device 110.

In some embodiments, an edge device 110 is provided physically to a cryptography service 102, and provisioning data 112 is transferred locally to the edge device 110. An edge device 110 may be provided physically by one or more entities that may physically ship, through one or more shipping or transportation services, the edge device 110 to a data center or data server location of a cryptography service 102. A cryptography service 102 may obtain an edge device 102 and cause provisioning data 112 to be transferred locally to the edge device 110. The cryptography service 102 may utilize through one or more physical data transfer interfaces (e.g., a universal serial bus (USB) interface, a serial advance technology attachment (SATA) interface, and the like) of the edge device 110 to transfer the provisioning data 112 to the edge device 110. The edge device 110 may be returned to an original location of the edge device 110 (e.g., edge environment 108) through one or more shipping or transportation services.

Figure 2:
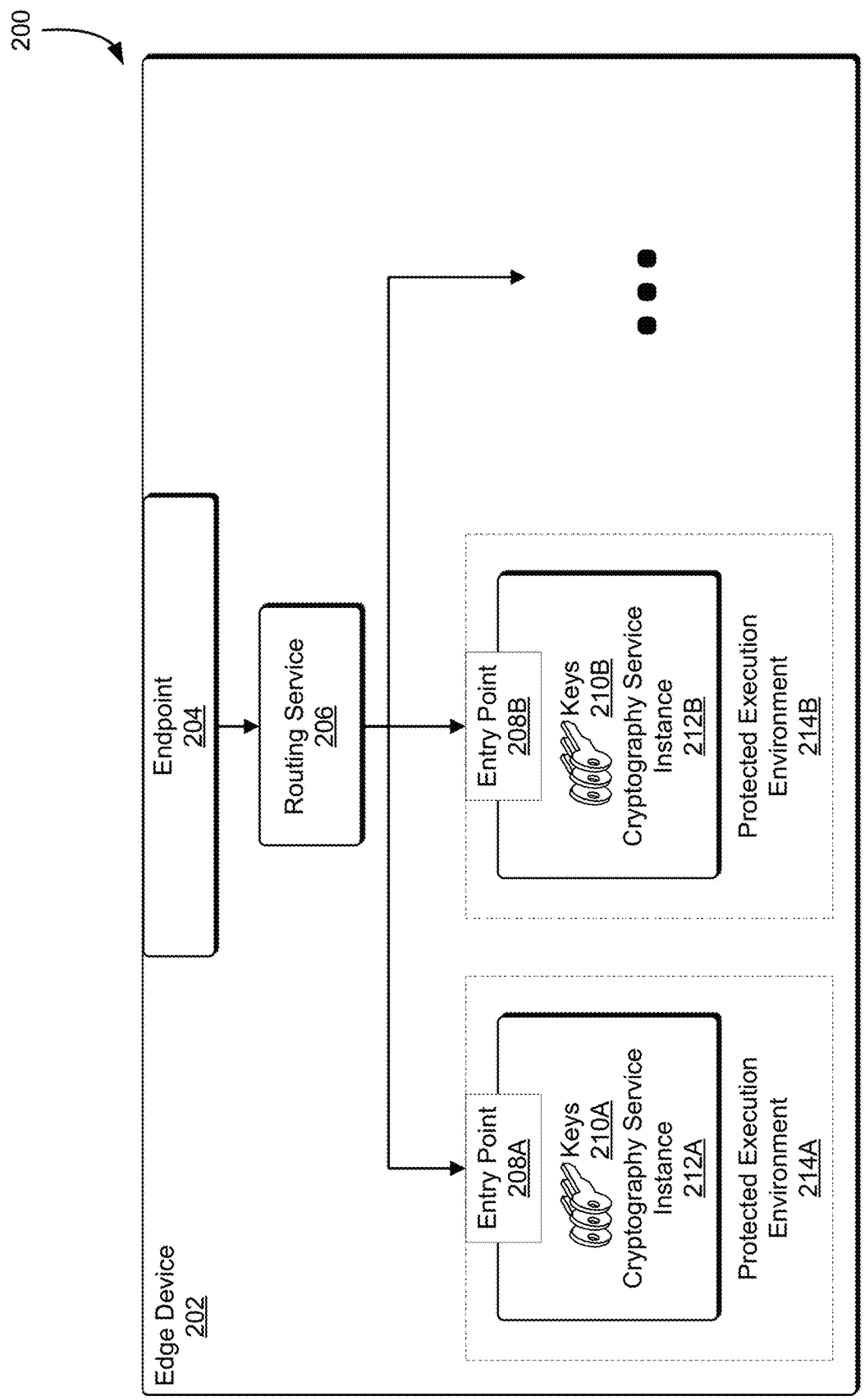
FIG. 2 shows an illustrative example of a computing environment of an edge device.

FIG. 2 shows an illustrative example of a computing environment 200 of an edge device. The computing environment 200 includes an edge device 202 which comprises an endpoint 204, routing service 206, and a plurality of protected execution environments. FIG. 2 depicts an illustrative embodiment with a protected execution environment 214A comprising an entry point 208A and a cryptography service instance 212A comprising keys 210A, and a protected execution environment 214B comprising an entry point 208B and a cryptography service instance 212B comprising keys 210B, and so on. Edge device 202 may be implemented in accordance with those described elsewhere in this disclosure, such as those discussed in connection with FIG. 1.

Edge device 202 may be a computing device that is operating in a limited network connectivity environment, which may be referred to as an edge environment. Edge device 202 may be any suitable computing device such as a computer, computing system, server system, mobile computing device, and/or variations thereof. Edge device 202 may include one or more processors, and memory storing instructions executable by the one or more processors. Edge device 202 may include an endpoint 204. Endpoint 204 may be a collection of one or more hardware and/or software network components that transmit and/or receive data from one or more networks. Endpoint 204 may, in connection with one or more network interfaces, obtain requests for cryptographic operations to be performed. Endpoint 204 may receive or otherwise obtain requests for cryptographic operations to be performed through one or more network interfaces from one or more clients/client devices.

Edge device 202 may obtain executable code over a global network (e.g., Internet) from a cryptography service in a computing resource service provider. Edge device 202 may execute the executable code, which may cause the edge device 202 to instantiate the routing service 206, and provision a protected execution environment comprising a cryptography service instance (e.g., the protected execution environment 214A comprising the cryptography service instance 212A). In some examples, the code of the routing service 206 may run outside the context of the protected execution environments shown in FIG. 2 and be considered untrusted code by virtue of being executed outside the context of a protected execution environment, and the code of the protected execution environment comprising the cryptography service instance may be referred to as trusted code of the executable code. In this context, trusted code may refer to code of the protected execution environment 214A and the protected execution environment 214B, and untrusted code may refer to code of the routing service 206.

Routing service 206 may be a collection of computing resources that routes requests for cryptographic operations to appropriate cryptography service instances. Routing service 206 may be a software application or program executing on the edge device 202 that may analyze requests for cryptographic operations, and determine where to route the requests. Requests may be routed based on various logic; for example, a request may be obtained that indicates an encryption operation to be performed with a first cryptographic key. Continuing with the example, routing service 206 may determine an appropriate cryptography service instance that comprises the first cryptographic key, and route the request to a protected execution environment comprising the determined cryptography service instance.

Protected execution environment 214A may be a protected area in memory address space of edge device 202. A protected area may be managed and/or encrypted by a central processing unit of edge device 202. A protected area may only be decrypted and accessed within a central processing unit. Further information regarding enclaves can be found in the description of FIG. 7. Protected execution environment 214A may include the entry point 208A. Entry point 208A may be a trusted function that transitions execution from a non-secured computing environment of the edge device 202 outside the context of the protected execution environment 214A to the protected execution environment 214A. Entry point 208A may be a predefined function that can be used to pass data and/or parameters to the cryptography service instance 212A. Entry point 208A may comprise one or more functions that can be used to provide data to or obtain data from the cryptography service instance 212A.

Edge device 202 may provision the protected execution environment 214A and instantiate the cryptography service instance 212A in the protected execution environment 214A. Cryptography service instance 212A may be a software application or program that is usable to fulfill requests for cryptographic operations to be performed. Cryptography service instance 212A may comprise one or more functions that perform various cryptographic operations. Edge device 202 may provision the protected execution environment 214B and instantiate the cryptography service instance 212B, which may provide the same or similar functionality to the protected execution environment 214A comprising the cryptography service instance 212A. Edge device 202 may comprise any number of protected execution environments comprising cryptography service instances. In various embodiments, protected execution environments of edge device 202 may each be running on one or more virtual hosts, in which access to a particular protected execution environment may be done through a corresponding virtual host that runs the particular protected execution environment.

For example, a client may, via a client device, submit a request for a cryptographic operation to be performed to the endpoint 204. Continuing with the example, the edge device 202 may obtain the request, in which the routing service 206 may determine which cryptography service instance to route the request to. Continuing with the example, the routing service 206 may determine to route the request to the cryptography service instance 212A, in which the routing service 206 may submit data of the request to the cryptography service instance 212A through the entry point 208A (e.g., by passing data of the request or the request itself through an entry point function). Further continuing with the example, the cryptography service instance 212A may perform the cryptographic operation indicated in the request, and provide results of the cryptographic operation from the protected execution environment 214A to the client device (e.g., transmitted from a network interface of the edge device 202).

Figure 3:
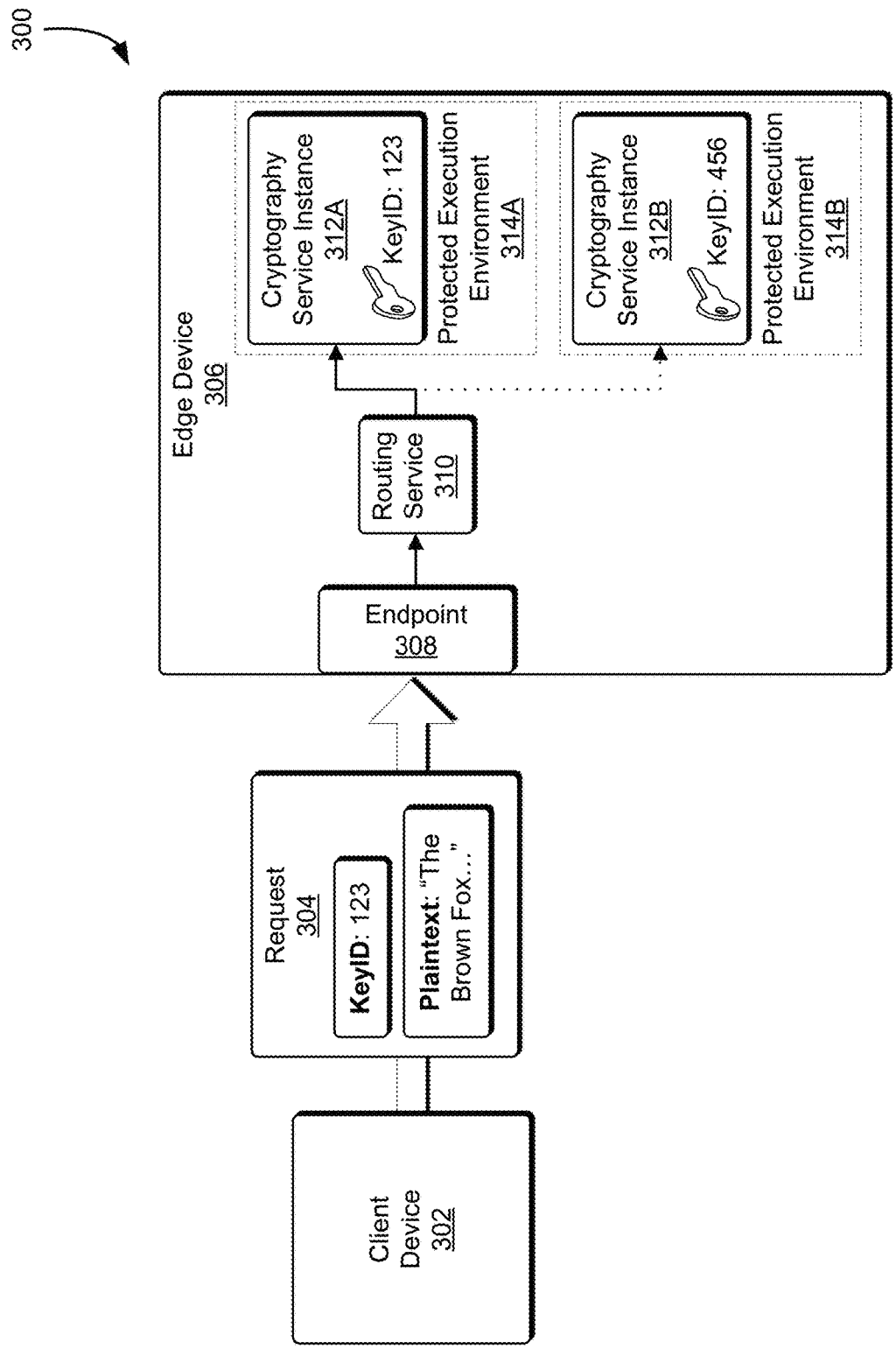
FIG. 3 shows an illustrative example of a computing environment in which a cryptographic operation request is routed to a specific protected execution environment.

FIG. 3 shows an illustrative example of a computing environment 300 in which a cryptographic operation request is routed to a specific protected execution environment. The computing environment 300 includes a client device 302 that may submit a request 304 to an edge device 306. Edge device 306 may include an endpoint 308 and a routing service 310 that routes data to either a protected execution environment 314A comprising a cryptography service instance 312A or a protected execution environment 314B comprising a cryptography service instance 312B. Edge device 306 may be implemented in accordance with those described elsewhere in this disclosure, such as those discussed in connection with FIGS. 1 and 2.

Edge device 306 may be a computing device in an edge environment executing code for endpoint 308, routing service 310, protected execution environment 314A comprising cryptography service instance 312A, and protected execution environment 314B comprising cryptography service instance 312B. Routing service 310 may be a program executing on the edge device 306 that determines which cryptography service instance to route requests for cryptographic operations to.

Client device 302 may be a computing device in the edge environment operated by a client that performs cryptographic operations. Client device 302 may include one or more computing devices operated by one or more entities in the edge environment. Client device 302 may submit a request 304 indicating a cryptographic operation to be performed to the edge device 306. Request 304 may be a collection of data that indicates the cryptographic operation. In some examples, request 304 may be formatted as a web service API request. Client device 302 may submit request 304 through one or more local area networks to the edge device 306. Request 304 may comprise or otherwise specify data associated with the cryptographic operation to be performed. Referring to FIG. 3, the request 304 may indicate that the cryptographic operation is to be performed on data identified by "Plaintext: "The Brown Fox . . . "" using a cryptographic key identified by "KeyID: 123."

Edge device 306 may obtain request 304 via endpoint 308. Routing service 310 may analyze request 304 to determine where the request 304 should be routed to. Referring to FIG. 3, routing service 310 may analyze the request 304 to determine that the request 304 specifies the "KeyID: 123," and determine that the cryptography service instance 312A comprises the key identified by the "KeyID: 123." Routing service 310 may route the request 304 to the cryptography service instance 312A of the protected execution environment 314A. Routing service 310 may provide the request 304 to the cryptography service instance 312A through one or more entry points of the protected execution environment 314A. Routing service 310 may provide the request 304 to the cryptography service instance 312A through an identified entry point of the protected execution environment 314A. Routing service 310 may invoke the entry point as part of fulfillment of the request 304. In some examples, the routing service 310 may only provide portions of the request 304 to the cryptography service instance 312A that indicate the relevant information of the request 304 (e.g., the cryptographic operation, the cryptographic key identifier, and the data).

Cryptography service instance 312A may perform the cryptographic operation indicated in the request 304. Referring to FIG. 3, the cryptography service instance 312A may perform the cryptographic operation on the data identified by "Plaintext: "The Brown Fox . . . "" using the cryptographic key identified by "KeyID: 123." Results of a cryptographic operation may be provided by cryptography service instance 312A from protected execution environment 314A, and transmitted back to client device 302 from edge device 306 through one or more local area networks.

Figure 4:
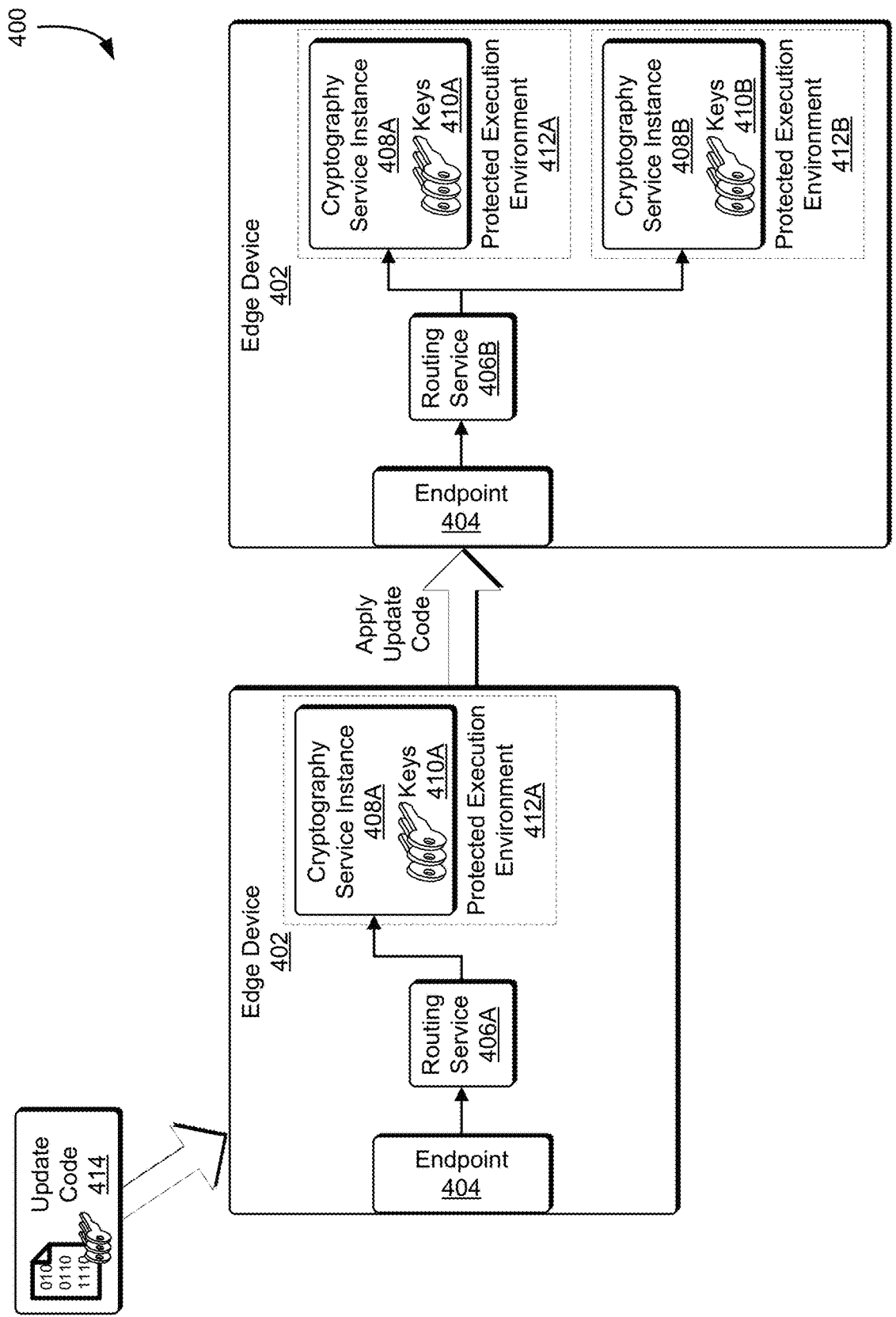
FIG. 4 shows an illustrative example of a computing environment in which a cryptography service instance is added to a device.

FIG. 4 shows an illustrative example of a computing environment 400 in which a cryptography service instance is added to a device. The computing environment 400 includes an edge device 402, comprising an endpoint 404, routing service 406A, and protected execution environment 412A comprising a cryptography service instance 408A with keys 410A, which may obtain and apply update code 414. Update code 414 may cause the edge device 402 to instantiate a routing service 406B and provision a protected execution environment 412B comprising a cryptography service instance 408B with keys 410B.

Edge device 402 may be a computing device in an edge environment executing code for the endpoint 404, the routing service 406A, and the protected execution environment 412A comprising the cryptography service instance 408A with the keys 410A. A client or user of the edge device 402 may provision another protected execution environment in the edge device 402 for processing cryptographic requests using the keys 410B. A client may submit a request via the edge device 402 or other computing device to a cryptography service provided by a computing resource service provider indicating the keys 410B. A cryptography service provided by the computing resource service provider may obtain a request, and generate update code 414. In some examples, keys 410A may be updated as a result of one or more key rotation or key update processes, in which a cryptography service provided by a computing resource service provider may generate update code 414 in response to detecting occurrence of updates to the keys 410A. Update code 414 may be executable code that, when executed by a device such as edge device 402, causes the device to provision a protected execution environment comprising a cryptography service instance that can perform cryptographic operations with the keys 410B, which may be additional keys different from the keys 410A or keys determined as a result of updates to the keys 410A. Update code 414 may be referred to as updated service executable code.

Edge device 402 may obtain update code 414. Edge device 402 may obtain update code 414 through one or more networks, which may be cryptographically secured (e.g., communications between the one or more networks may be encrypted). In some embodiments, the edge device 402 may be provided physically to the cryptography service of the computing resource service provider (e.g., shipped to a physical data center location of the cryptography service) in which update code 414 may be transferred locally to the edge device 402. Edge device 402 may apply or otherwise execute update code 414.

Update code 414 may cause the edge device 402 to provision the protected execution environment 412B comprising the cryptography service instance 408B with the keys 410B. Update code 414 may cause the edge device 402 to update the routing service 406A to the routing service 406B. In some examples, update code 414 may cause the routing service 406A to be replaced with the routing service 406B. Routing service 406A may be updated to or otherwise replaced by the routing service 406B such that requests for cryptographic operations can be routed to the cryptography service instance 408B.

Update code (e.g., update code 414) may scale cryptography service instances of an edge device (e.g., edge device 402) by adding cryptography service instances to the edge device. In some examples, cryptography service instances are scaled by provisioning one or more additional edge devices to run one or more additional cryptography service instances. Additional edge devices may be provisioned to run cryptography service instances, which may already be running on one or more edge devices, in which the additional edge devices and the one or more edge devices may both be usable to perform various cryptographic operations. In various embodiments, one or more administrators or clients provision additional edge devices to an edge environment to run cryptography service instances with cryptographic keys that are the same or different as cryptographic keys of existing cryptography service instances of edge devices in the edge environment.

The cryptography service instance 408A may be associated with a first entry point and the cryptography service instance 408B may be associated with a second entry point. In some examples, the second entry point may replace the first entry point; update code 414 may cause the edge device 402 to provision the protected execution environment 412B comprising the cryptography service instance 408B, which may replace the protected execution environment 412A comprising the cryptography service instance 408A, and the update code 414 may cause the routing service 406A to update to or otherwise replace the routing service 406B such that requests can no longer be routed to the cryptography service instance 408A of the protected execution environment 412A. In some examples, the second entry point may be in addition to the first entry point; update code 414 may cause the edge device 402 to provision the protected execution environment 412B comprising the cryptography service instance 408B, which may be in addition to the protected execution environment 412A comprising the cryptography service instance 408A, and the update code 414 may cause the routing service 406A to update to or otherwise replace the routing service 406B such that requests can be routed to either the cryptography service instance 408A of the protected execution environment 412A or the cryptography service instance 408B of the protected execution environment 412B. In some examples, the keys 410B are the keys 410A after a key rotation, in which the cryptography service instance 408A of the protected execution environment 412A may only be usable for decryption requests.

Figure 5:
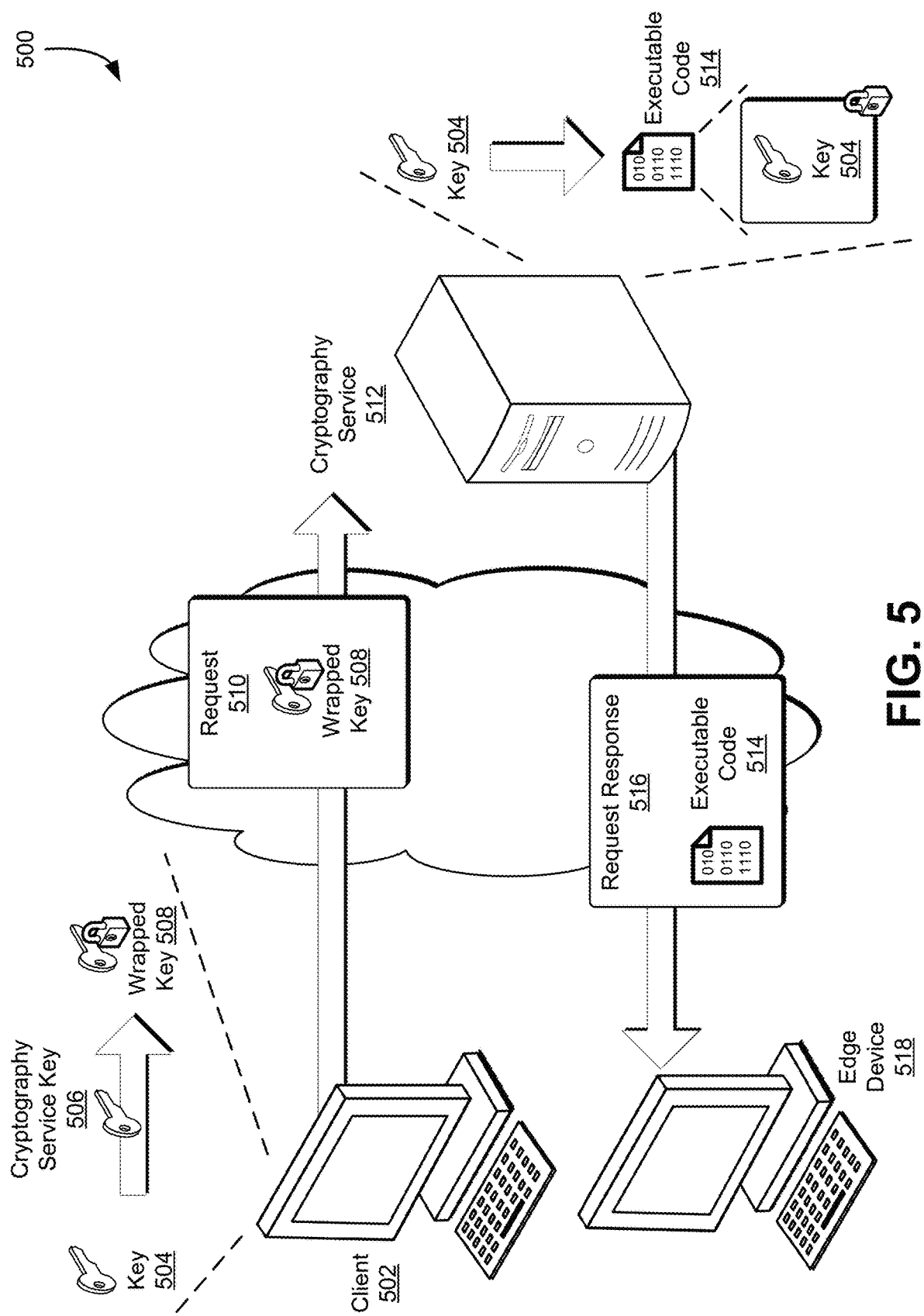
FIG. 5 shows an illustrative example of a computing environment in which a client provides a key to be used in a cryptography service instance.

FIG. 5 shows an illustrative example of a computing environment 500 in which a client provides a key to be used in a cryptography service instance. The computing environment 500 includes a client 502 that may generate a key 504, encrypt key 504 with a cryptography service key 506 to generate a wrapped key 508, and provide the wrapped key 508 to a cryptography service 512 via a request 510. Cryptography service 512 may obtain key 504 and generate executable code 514. Executable code 514 may be provided to edge device 518 as part of a request response 516. The client 502, the edge device 518, and the cryptography service 512 may be implemented in accordance with those described elsewhere in this disclosure, such as those discussed in connection with FIG. 1.

An edge device 518 may be utilized to perform cryptographic operations using key 504. A client 502 may generate key 504. In some examples, key 504 may be provided to client 502 from one or more entities through one or more systems. Key 504 may be generated through one or more key derivation functions. Key 504 may be encrypted using the cryptography service key 506. Client 502 may generate key 504 and encrypt key 504 using the cryptography service key 506 to generate the wrapped key 508. In some examples, cryptography service key 506 may be a key of the cryptography service 512, such as a public key. Cryptography service key 506 may be a key of an asymmetric cryptography scheme or symmetric cryptography scheme. Cryptography service key 506 may be obtained from the cryptography service 512. Cryptography service key 506 may be publicly available from the cryptography service 512, or may be obtained through one or more key exchange operations with the cryptography service 512.

A client 502 may submit request 510 comprising the wrapped key 508 to cryptography service 512. In an embodiment, a client 502 is an administrative device that is not necessarily operating in an edge environment. A client 502 may be an administrator of one or more cryptography service instances of one or more edge devices of an edge environment. A client 502 may provision an edge device, such as edge device 518, operating in an edge environment to run a cryptography service instance to provide cryptographic services in the edge environment, in which the client 502 may or may not be operating in the edge environment. A request 510 may be a request for executable code such as those described in connection with FIG. 1. A client 502 may submit request 510 through a browser or other application. A client 502 may submit request 510 through one or more networks, which may be cryptographically secured. In some examples, the request 510 may be a web service API request. Cryptography service 512 may obtain request 510 through the one or more networks. Cryptography service 512 may obtain key 504 from the request 510. In some examples, cryptography service 512 may obtain key 504 by decrypting a wrapped key 508 using a key, such as a private key, of the cryptography service 512. In some examples, cryptography service 512 may obtain key 504 by decrypting a wrapped key 508 using a key (e.g., a cryptography service key 506) obtained through one or more key exchange operations with client 502.

Cryptography service 512 may generate the executable code 514 based at least in part on key 504. A key 504 may be encrypted within the executable code 514. Executable code 514 may be executable code that, when executed by a device such as edge device 518, causes the device to provision a protected execution environment comprising a cryptography service instance that can perform cryptographic operations with key 504. Executable code 514 may be provided to edge device 518 in the request response 516. In some examples, a client 502 causes executable code 514 to be pushed to or otherwise provided to edge device 518 by indicating a location of the edge device 518 in a request 510, in which a cryptography service 512 transmits or otherwise transfers the executable code 514 to the edge device 518 using the location. Edge device 518 may obtain executable code 514 and run or otherwise execute the executable code 514. Executable code 514, upon execution, may cause edge device 518 to provision a protected execution environment comprising a cryptography service instance within edge device 518. A cryptography service instance may be able to perform cryptographic operations using key 504, which may be protected within a protected execution environment.

Figure 6:
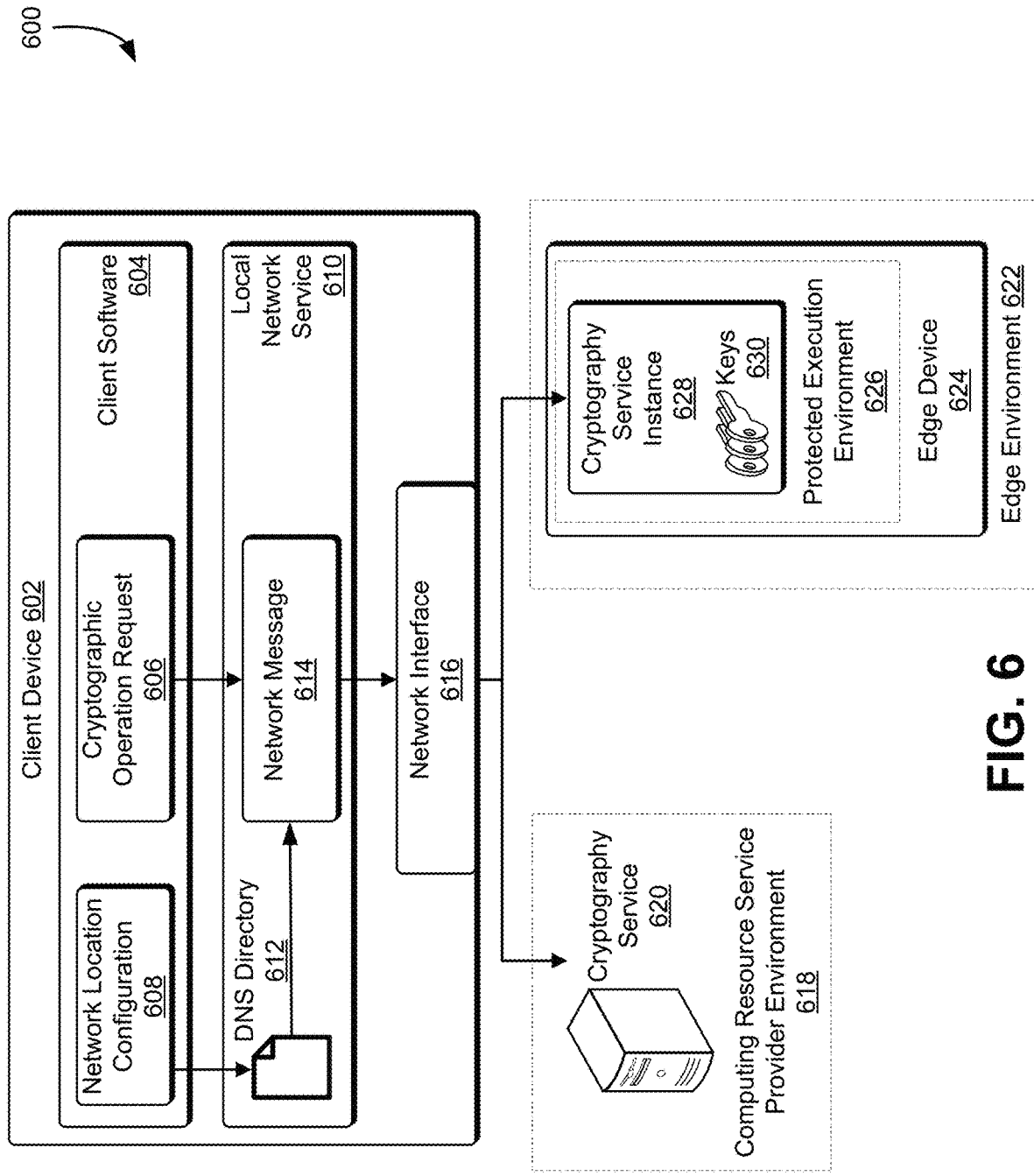
FIG. 6 shows an illustrative example of a computing environment of a client device.

FIG. 6 shows an illustrative example of a computing environment 600 of a client device. The computing environment 600 may include a client device 602 that comprises a client software 604, a local network service 610 comprising a domain name system (DNS) directory 612, and a network interface 616. Client software 604 may implement a cryptographic operation request 606 and a network location configuration 608, which may cause a network message 614 to be routed to a specified network location. Locations include a cryptography service 620 in a computing resource service provider environment 618 or a cryptography service instance 628 with keys 630 of a protected execution environment 626 of an edge device 624 in an edge environment 622. The cryptography service 620 and the edge environment 622 may be implemented in accordance with those described elsewhere in this disclosure, such as those discussed in connection with FIG. 1.

Client device 602 may be a computing device in an edge environment operated by a client. Local network service 610 may be a program running on client device 602 that determines where to route outgoing data from the client device 602. Local network service 610 may obtain data to be transmitted from client software 604, generate a network message comprising the data to be transmitted, and transmit the data according to the DNS directory 612. DNS directory 612 may comprise one or more databases that map host names to network locations (e.g., IP addresses). DNS directory 612 may comprise information that maps domain names to network locations. DNS directory 612 may be utilized by local network service 610 to determine a network location to transmit the data to. For example, a local network service 610 may obtain a request addressed to a first domain name, in which the DNS directory 612 may be utilized to determine a network location associated with the first domain name to transmit the request to. Data may be transmitted to and/or from client device 602 via network interface 616, which may be a collection of one or more computer networking components that receive and/or transmit data.

A client may perform cryptographic operations using the client device 602. A client device 602 may include the client software 604. Client software 604 may be a collection of software applications, programs, and other computing resources that perform various functions. Client software 604 may include software to request performance of various cryptographic operations, as well as software to configure various aspects of the client device 602. A client may use client software 604 to generate a cryptographic operation request 606. A cryptographic operation request 606 may be a collection of data that indicates a cryptographic operation to be performed and aspects of the cryptographic operation. Client software 604 may include the network location configuration 608, which may be an application or program that configures the DNS directory 612. A client may use network location configuration 608 to configure DNS directory 612 to cause cryptographic operation requests to be transmitted to either a cryptography service 620 in a computing resource service provider environment 618 or a cryptography service instance 628 with keys 630 of a protected execution environment 626 of an edge device 624 in an edge environment 622.

Cryptography service 620 may be a service provided by a computing resource service provider in computing resource service provider environment 618, and may be accessible through a global computer network, such as the Internet. Computing resource service provider environment 618 may be an environment with connectivity to one or more wide area and global computer networks, such as the Internet. Cryptography service 620 may be accessible through the Internet. Edge environment 622, which may also be referred to as an edge computing environment, may be an environment in which connectivity to one or more global computer networks, such as the Internet, is limited. Edge environment 622 may have little to no connectivity to one or more wide area and global computer networks. Edge environment 622 may have connectivity to the Internet, but connectivity to the Internet may have higher latency than connectivity to one or more local networks. Edge environment 622 may be an environment in which connectivity to the Internet is available, but connectivity to local networks and devices of the local networks of the environment is faster (e.g., has lower latency, higher available bandwidth). In an embodiment, a local network refers to a computer network, such as a local area network, that interconnects computing devices within a limited area, such as an edge environment. A local network may be a computer network that connects computing devices to each other through one or more wired and/or wireless networking technologies, such as Ethernet, Wi-Fi, Bluetooth, and the like. A local network may provide connectivity and methods of communication between devices operating in an edge environment. Edge environment 622 may be accessible through one or more local area networks that may be accessible to client device 602. A client may utilize a network location configuration 608 to route requests for cryptographic operations to either a cryptography service 620 (e.g., when connectivity to the Internet is available) or a cryptography service instance 628 of an edge device 624 (e.g., when connectivity to the Internet is unavailable and connectivity to one or more local area networks is available).

A client may use client software 604 to generate cryptographic operation request 606. Cryptographic operation request 606 may be addressed to or indicate a cryptography service. Cryptographic operation request 606 may be obtained by a local network service 610, which may generate a network message 614 based at least on the cryptographic operation request 606 and DNS directory 612. A network message 614 may be one or more network packets that indicate a destination and data of cryptographic operation request 606. A network message 614 may comprise cryptographic operation request 606 as well as address data that indicates a network location where the network message 614 is to be transmitted to. A network message 614 may be transmitted, via a network interface 616, to either a cryptography service 620 or a cryptography service instance 628 of an edge device 624 based on configuration of a DNS directory 612 by network location configuration 608.

For example, a client may use the network location configuration 608 to indicate that the network location of the cryptography service of the cryptographic operation request 606 is the network location of the cryptography service 620 of the computing resource service provider environment 618, in which the network message 614 may be transmitted to the cryptography service 620 of the computing resource service provider environment 618 where the cryptographic operation request 606 may be fulfilled. As another example, a client may use the network location configuration 608 to indicate that the network location of the cryptography service of the cryptographic operation request 606 is the network location of the edge device 624 in the edge environment 622, in which the network message 614 may be transmitted to the edge device 624 and routed to the cryptography service instance 628 where the cryptographic operation request 606 may be fulfilled. In some examples, a client device 602 may transmit all network messages that may indicate cryptographic operation requests to an edge device 624, in which the edge device 624 may comprise one or more network routing programs that may route the network messages to a cryptography service instance 628 of the edge device 624 or a cryptography service 620 of a computing resource service provider environment 618. An edge device 624 may comprise one or more programs that may determine where to route incoming requests for cryptographic operations based on various logic, such as availability (e.g., if cryptography service 620 of computing resource service provider environment 618 is available, route requests to the cryptography service 620, else, route requests to a cryptography service instance 628 of an edge device 624), and the like.

Figure 7:
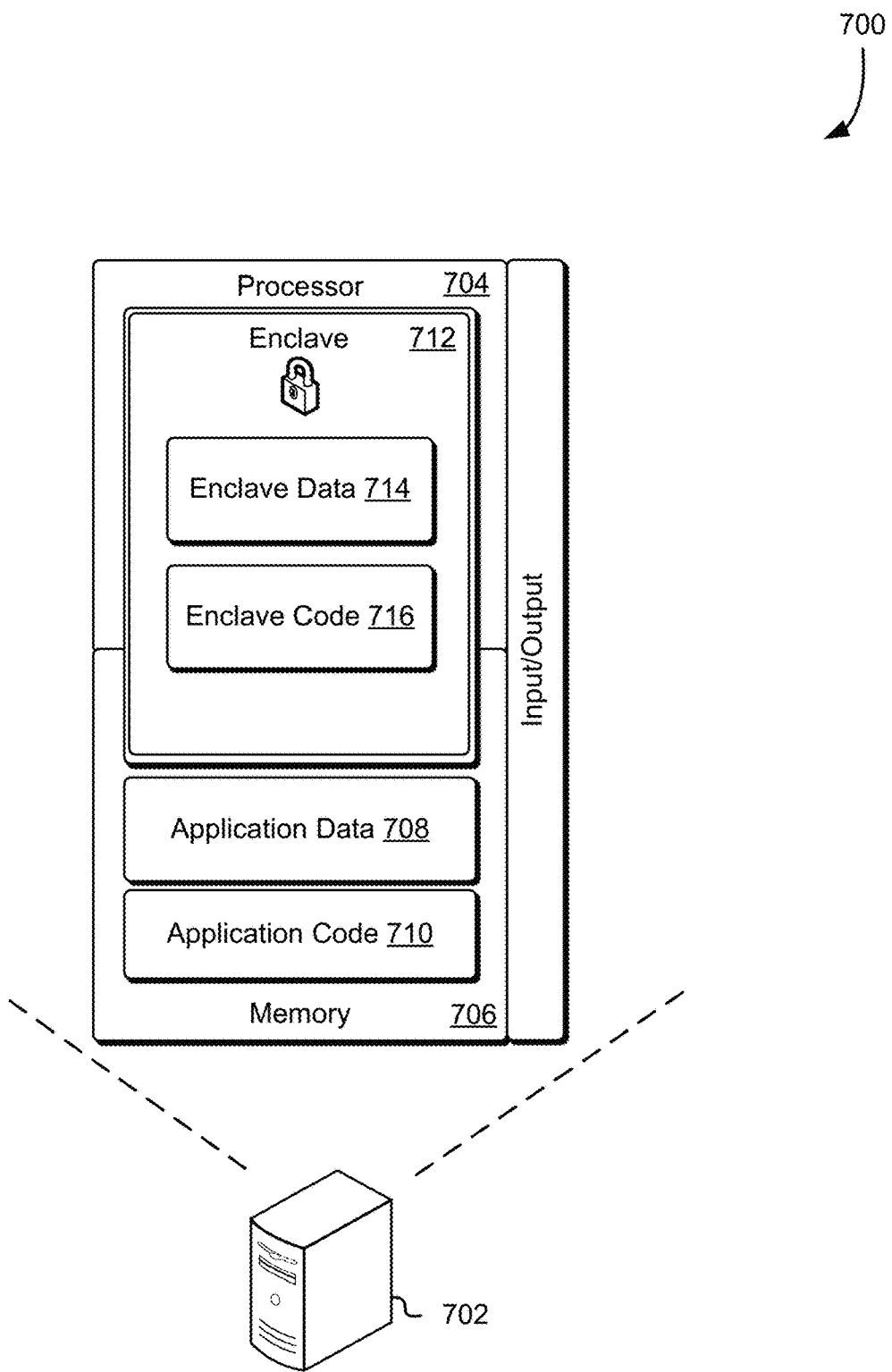
FIG. 7 illustrates an aspect of an environment in which various embodiments of the present disclosure may be practiced.

FIG. 7 illustrates an aspect of an environment 700 in which various embodiments of the present disclosure may be practiced. As illustrated in FIG. 7, the environment 700 may include a computer system 702 comprising one or more processors 704, memory 706, application data 708 and application code 710, and an enclave 712 supporting enclave data 714 and enclave code 716. The processor 704 may support enclave functionality, such as support for Intel® Software Guard eXtensions (SGX), a module such as a trusted platform module (TPM), system microcode or combinations of these and/or other supported capabilities, for instantiating an enclave 712. The enclave 712 may be implemented in the context of a computer system with an input/output module that can be used to communicate with entities external to the computer system via a virtual or physical network.

In at least some embodiment, a protected execution environment can be executed within the context of a security module such as a hardware security module (HSM). An HSM may refer to a physical computing device that safeguards cryptographic keys by storing them within a tamper-resistant physical device. HSMs provide cryptographic key generation and storage, and perform cryptographic operations for authorized clients of the HSM. In some embodiments, a HSM includes a processor to execute code wholly within the context of the HSM to implement a protected execution environment. In at least some embodiments, cryptographic keys that are stored in a HSM are not exposed in a plaintext format outside of the HSM.

An enclave 712—also referred to as a secure enclave or encrypted enclave—is a protected area in memory address space of a computer system that provides confidentiality and integrity for applications and data within the protected area, in accordance with at least one embodiment. An enclave 712 can be used to operate as a protected execution environment—that is, the enclave prevents applications external to the enclave, even privileged applications such as virtualization monitors, basic input/output systems, operating systems, external processes running at high privilege levels, and even other enclaves, from accessing the enclave memory address space, but applications executing within the enclave may access executable instructions and data internal to the enclave. An enclave may provide cryptographically verifiable assurance of confidentiality for data and/or executable code used in the context of the enclave's protected execution environment. An enclave 712 may prevent access to unencrypted enclave data (i.e., data resident within the enclave) by applications external to the enclave, and when the data is written to the memory address space, the data is automatically encrypted.

In various embodiments, a computer program executes application code 710 or a portion thereof outside the context of an enclave 712. A process, as part of executing the application code 710, may access application data 708 stored in various types of volatile memory such as registers, caches, and main memory (e.g., DRAM). The application code 710 may, at a point in execution, include an entry point to the enclave 712—for example, to perform an operation using private data that is not to be exposed outside the context of the enclave 712, even to privileged system code such as a hypervisor or operating system. The entry point may be a function call that transitions execution of a computer program from the application code 710 to enclave code 716 in a protected execution environment. When execution is transitioned to the protected execution environment, the enclave 712 has access to enclave data 714, enclave code 716, etc. Enclave code 716 may be executed and the processor executing the code may have access to the enclave data 714 as well as application data 708 in a non-secure region of memory. Upon completion of at least a portion of enclave code, data (e.g., result(s) of execution of the enclave code) may be passed back to the application code 710 which may resume execution in the non-secured region. Information exiting the enclave 712 may be cleansed of data referring to the enclave's protected memory addresses to prevent external software from determining the location of enclave-protected data in memory. The enclave 712 may be used to perform various cryptographic operations, which may be performed in one or more cryptography service instances of the enclave 712. The one or more cryptography service instances may be implemented using the enclave data 714 and the enclave code 716.

In at least some embodiments, entry points to the enclave 712 are pre-defined—for example, at compile time. An enclave entry point may be a trusted function that transitions execution of a computer program from a non-secured computing environment outside the context of an enclave 712 to a protected execution environment within the enclave 712. As an example, Intel® SGX supports enclave calls (ECALLs) as a type of pre-defined function which can be used to pass data and/or parameters to the enclave. Enclave data 714 and/or enclave code 716 may be stored in a specific region of trusted memory that is encrypted. In some embodiments, enclave data and enclave code is stored in an enclave page cache (EPC), encrypted under a cryptographic key generated by a physical processor on boot. Memory pages stored in the EPC may be decrypted only within a physical processor core.

Enclave functionality may be provided to a system through software, such as under the control of a hypervisor or a kernel of an operating system that allows virtualized user space instances, or through hardware by a specialized instruction set, such as Intel® Software Guard eXtensions (SGX), a module such as a trusted platform module (TPM), system microcode or combinations of these. Enclave functionality allows programmatic instantiation of an enclave, which may comprise initializing of an enclave control structure, allocating enclave memory, loading of enclave contents (e.g., applications and/or data loaded into the enclave) into the enclave memory, measuring of the enclave contents, and establishing an enclave identity. Enclave functionality may also include the ability to protect applications and/or data within the enclave from malicious software attacks, by detecting integrity violations of protected applications and/or data and preventing access to protected applications and/or data that fail integrity checks. It should be noted that an "application" as described herein may refer, based on the context of the description, to a computer program that both a non-secured portion running outside the context of an enclave, a secured portion that runs within the context of an enclave, or a combination of the two.

A characteristic of an enclave is an ability to provide remote attestation as to the state of the enclave. For example, the enclave may have a set of functions that, when executed by a processor, provide a measurement indicating the current state of executable code and/or data within the enclave. Another characteristic of an enclave is that it has a root of trust separate and protected from outside entities. That is, the enclave may have cryptographic keys resident within the enclave for digitally signing data output from the enclave, and, by verifying the digital signature, applications external to the enclave may be configured to trust the output data. Cryptographic keys resident within the enclave may be inaccessible to applications and systems external to the enclave.

Enclave code may include, for example, computer-readable executable instructions that, as a result of execution by one or more processors, performs at least a portion of a process, such as any processes in accordance with those described in connection with FIGS. 1-6 and 8-13. The processor 704 may include any suitable processing device capable of supporting enclaves, including processing devices based on Intel® Software Guard eXtensions. The memory 706 may include a number of types of memory, such as described below in connection with FIG. 13.

Application data 708 may include data structures, memory structures, and various other types of data that may be utilized in the course of the execution of application code 710. Application code may include, for example, computer-readable executable instructions that, as a result of execution by one or more processors, performs at least a portion of a process, such as any processes in accordance with those described in connection with FIGS. 1-6 and 8-13. For example, application code may be configured to execute portions of processes described in connection with FIGS. 1-6 and 8-13 that are outside of the enclave. In general, an application may have instructions in the form of application code and data that is utilized in the execution of the instructions in the form of application data. In some cases, an enclave 712 stores enclave data and/or enclave code within a protected execution environment so that the enclave data is not available to processes outside of the protected execution environment. As noted, the enclave 712 may be a protected execution environment provided by supporting hardware or software on the computer system such as by a specialized instruction set, such as Intel® Software Guard eXtensions (SGX), a module such as a trusted platform module (TPM), system microcode, a hypervisor configured to manage a virtualization of protected execution environments or combinations of these and/or other supported capabilities. In this manner, a protected execution environment (e.g., an enclave) may be configured such that enclave data within the protected execution environment is protected from entities outside the protected execution environment.

Application code 710 may include computer executable instructions that may be executed on a computer system, including an operating system, system and hardware drivers, business applications, entertainment applications, web browsers, e-mail clients, and anti-virus and other anti-malware applications. In some embodiments, enclave code runs one or more routines that may be instantiated within the enclave 712 on the computer system. As noted, the enclave 712 may be a protected execution environment provided by supporting hardware or software on the computer system such as by a specialized instruction set, such as Intel® Software Guard eXtensions (SGX), a module such as a trusted platform module (TPM), system microcode, a hypervisor configured to manage a virtualization of protected execution environments or combinations of these and/or other supported capabilities. One characteristic of a protected execution environment is the ability to provide remote attestation as to the state of the protected execution environment. For example, the protected execution environment may have a set of functions that, when executed by a processor, may provide a measurement indicating the current state of executable code and/or data within the enclave. Another characteristic of a protected execution environment is that it has a root of trust separate and protected from outside entities. That is an entity (e.g., an application running on a device operated by a user), may be configured to trust the protected execution environment because the protected execution environment may have cryptographic keys, such as a private key of a public-private key pair, not visible to outside entities, and outside entities can verify (e.g., trust) information coming from the protected execution environment because the information may be verified as digitally signed with the private key of the enclave. In this manner, a protected execution environment (e.g., an enclave) may be configured such that enclave code within the protected execution environment is protected from entities outside the protected execution environment.

The enclave 712 may be provided by selecting computer systems being configured to support the instantiation of enclaves and causing the enclave 712 to be instantiated. The computer systems may support the instantiation of enclaves based on the hardware capabilities of the system. For example, enclave functionality may be provided to a system by a specialized instruction set, such as Intel® Software Guard eXtensions, a module such as a trusted platform module, system microcode or combinations of these and/or other supported capabilities. As an example, the enclave 712 may be provided by selecting a computer system, such as from a web-based management console, from computer systems configured to support enclave functionality.

Enclave functionality may include functionality for creating, deprovisioning, measuring (e.g., gathering metrics from), and populating enclaves. Enclave functionality may further include generating keys and/or sending and receiving data. Access to such enclave functionality may be provided by a code library, an interface, web service, application programming interface (API), or other access methodology. In response to receiving a request through one of the methods of accessing enclave functionality, a computing resource service provider may provide that access to a user of a computer system. Note that the providers of enclave functionality, the types of enclave functionality, and the methods of providing access to enclave functionality described are for illustrative purposes and, as such, other providers of enclave functionality, types of enclave functionality and methods of providing access to enclave functionality as would be contemplated by a person having ordinary skill in the art may be considered as within the scope of the present disclosure.

In some embodiments, upon instantiation or upon request, instructions executed within the enclave 712 by a processor may generate a set of cryptographic keys for encrypting, decrypting, and performing integrity validation of data passing between the enclave 712 and another entity. In some cases, the set of cryptographic keys may be a key-pair based on an asymmetrical public-private cryptographic scheme, and instructions executed within the enclave 712 by a processor may provide the public key of the key-pair to a trusted entity and retain the private key of the key-pair securely within the enclave 712 where it may not be accessible to outside entities. Subsequently, the trusted entity may encrypt data and/or instructions using the public key and provide the encrypted data and/or instructions to the enclave 712, whereupon instructions executed within the enclave 712 by a processor may decrypt the data and/or instructions using the private key held within the enclave 712. Alternately or additionally, instructions executed within the enclave 712 by a processor may digitally sign results of processing or execution using the private key within the enclave 712 to provide assurance to the trusted entity that the output has not been tampered with or forged.

In other embodiments usable in combination with other embodiments, the trusted entity may generate a set of cryptographic keys for encrypting, decrypting, and performing integrity validation of data passing between the enclave 712 and another entity. In some cases, the set of cryptographic keys may be a key-pair based on an asymmetrical public-private cryptographic scheme, and the trusted entity may provide the public key of the key-pair to the enclave 712 and retain the private key of the key pair. Subsequently, instructions executed within the enclave 712 by a processor may encrypt data and/or results of processing or execution using the public key before providing the data and/or results to the trusted entity, whereupon the trusted entity may decrypt the encrypted data and/or results using its private key. Alternately or additionally, the trusted entity may digitally sign data and/or instructions provided to the enclave 712 using the private key of the trusted entity to provide assurance to the enclave 712 that the data and/or instructions have not been tampered with or forged. Alternately or additionally, in a technique referred to as enveloping, instructions executed within the enclave 712 by a processor may provide the trusted entity with a session key encrypted using the public key of the trusted entity. Subsequently, instructions executed within the enclave 712 by a processor may provide encrypted data and/or results of processing of execution, whereupon the trusted entity may decrypt the encrypted data and/or results using the session key.

A computer system for hosting enclaves may be a distributed system with multiple hosts, may be a single system with virtual machine instances or may be a networked combination of such systems. A computer system may provide access to such as users, customers, modules, applications, services, processes, programs, operating systems, and controlling domains. Some of the access provided by the computer system to these entities may include providing access to confidential data and/or privileged applications. A computer system may also provide data storage regions to the customer, including memory, disk storage, virtual memory and virtual disk storage. Consequentially, some of the data storage regions provided by the computer system may be configured to store confidential and/or otherwise significant data.

A computer system for hosting enclaves may also run entities (e.g., applications, processes, services, modules, etc.) configured to access and/or manipulate such confidential data. A computer system may also run applications from a computing resource service provider that may utilize privileged code or perform operations on confidential data. Additionally, a computer system may include operating systems, privileged users, and controlling domains having full access to the computer system resources, such as direct access to the computer memory 706, processors, data storage, and the network. A customer may wish to secure confidential data, and any applications configured to access such confidential data, by preventing access to the data and/or applications by entities without proper credentials, even those entities that are typically trusted entities such as operating systems, privileged users, and controlling domains. Similarly, a computing resource service provider may be configured to secure such confidential data and any applications configured to access the confidential data by preventing access to the confidential data and applications by any entity without proper credentials.

An entity, such as a service or operating system running on the computer system, the controlling domain, a guest domain running a virtual machine instance, or a service or operating system of the controlling domain or a guest domain, may provide an interface to enclave functionality. An entity (e.g., a user operating a device running applications) with access to a virtual machine instance on the computer system may use that interface to the enclave functionality to, for example, create an enclave, populate the enclave, and/or obtain keys.

In an illustrative example, a computer system may provide enclave functionality, as noted, via the SGX instruction set that may be enabled on the CPU of the computer system, although the scope of the present disclosure extends to other enclaves. The physical hardware of the computer system may be any device or equipment configured to execute instructions for performing data computation, manipulation or storage tasks, such as a computer or server. The computer system may be equipped with processors 704, including a CPU, a graphics processing unit (GPU), and a digital signal processor (DSP). The computer system may further include memory 706, including static and dynamic volatile memory, and non-volatile persistent storage such as optical and magnetic storage disks, tape, and flash memory. The computer system may also include additional hardware such as buses, input/output modules, and networking equipment compliant with any handshaking, communications or data transfer protocol.

As noted, a host computer system may provide enclave functionality through instructions made to the processors 704 configured to support a protected execution environment, such as SGX, TPM or a hypervisor configured to support management of protected execution environments. The enclave functionality may be provided to various other services running on the host computer system. For example, a virtual computer system service of a computing resource service provider running on the host computer system may provide enclave functionality to a virtual machine instance running under the control of the virtual computer system service. Similarly, other services, such as block-level data storage services, cryptography services, on-demand data storage services, archival storage services, notification services, authentication services, policy management services, billing services and task services, may also access the enclave functionality to provide that functionality to resources associated with those services. Enclave functionality may also be provided to customers of the computing resource service provider. For example, an entity with access to a service and/or access to the resources served by that service may use enclave functionality to further secure data and/or applications associated with that service. In an illustrative example, a virtual computer system service and/or a virtual machine instance associated with that virtual computer system service may use the enclave functionality to create an enclave, populate the enclave with data and/or applications, obtain keys for decrypting results from the enclave, start the applications within the enclave and receive updates.

The measurements may indicate a current state of the enclave 712 and/or contents within the enclave 712. The measurements may be evaluated within the enclave 712 or may be sent outside the enclave 712. Enclaves may be configured such that measurements are performed entirely within a secure portion of the processors 704 and may also be configured so that the measurements are signed by secret materials provided by the processors 704, such as, for example, microcode running on the processors 704 or a private key. In this way, measurements may be verified as correct by trusted users using the functionality provided with the enclave. Measurements may be verified by, for example, an application programming interface, which may provide information usable to determine the state of the processors 704.

The measurements may be based on measurements obtained from host computer system hardware, such as, for example, measurements obtained by utilizing SGX instructions supported by the processors 704 of the host computer system. In order to obtain the measurement, the enclave 712 may first need to be paused or frozen by halting the execution of applications running within the enclave 712 and/or by placing the applications in a certain determined state. By pausing and/or freezing the applications and/or placing the applications in a determined state, external verification that the enclave 712 and its contents have not been tampered with may be made by comparing the measurements with predicted values. Measurements may include, in some embodiments, verification and/or validation that the measurements were performed by a trusted, verified and/or validated source. For example, measurements performed by the processors 704 executing the appropriate SGX instructions may be digitally signed by the processors 704 and thereby verified as coming from the particular processors 704. Likewise, measurements coming from a TPM may include a similar verifiable signature with the measurements as an assurance that the measurements were performed by the TPM and/or a process running thereon.

Application code and/or data installed in the enclave 712 may include applications to provide access to and/or process other types of confidential data. For example, a payment processing application running as a web service on a host computer of a computing resource service provider may be executed in the enclave 712 by first measuring the application, encrypting the application, injecting the application into the enclave 712, and finally decrypting and running the application within the enclave 712. Note that the methods of providing access to enclave functionality described are for illustrative purposes and, as such, other methods of providing access to enclave functionality as would be contemplated by a person having ordinary skill in the art may be considered as within the scope of the present disclosure.

In some embodiments, the enclave functionality may be provided as an application, process or module, and may, in some cases, be implemented as a single instance on a computer system providing enclave functionality for virtual machine instances. The application, process or module so configured may also operate on a remote machine and/or may provide enclave functionality in a distributed and/or hierarchical manner. Said application, process or module may further be configured to start automatically when a machine and/or virtual machine is started, or, alternately, may be started as needed (e.g., when a client entity requests access to the enclave functionality).

In at least one embodiment, enclave 712 is used to control the data flowing into or out of a computer system and/or perform authorization logic for a customer of a computing resource service provider without confidential data, such as unencrypted passwords or decryption keys, being made available to the computing resource service provider. Entities outside of the enclave 712, including the operating system, other applications and/or users, may not access the data stored in the enclave 712. In some embodiments, data and application code may be provided to the enclave 712 in encrypted form. In some embodiments, data and/or results of the processing of applications may be output from the enclave 712 in encrypted form. The enclave 712 may receive stored data, for example, from a computer system, process the data according to a particular request from an entity, such as a user, customer, service or application, utilizing executable instructions running within the enclave 712. The stored data may be received in encrypted form, and the processing may include decrypting the stored data using a decryption key held within the enclave 712. Instructions executed within the enclave 712 by a processor may determine whether to provide the data or a subset of the data to the requestor and, based on the determination, may or may not transform the data into another form before providing the data to the requestor. The transformation of the data may entail encrypting the data with the same key as it may have been encrypted with before the enclave 712 received it, encrypting or re-encrypting with a different key, and/or some other transformation of the data, such as censored (e.g., redacted) portions of the data.

In at least one embodiment, a customer provides an enclave 712 with data to be stored in a data store, such as a data store on the data server of the data storage service. In some of these embodiments, the customer may request that the enclave 712 encrypt the data before storing the data. In some of these embodiments usable in combination with other embodiments, instructions executed within the enclave 712 by a processor may encrypt the data by default before storing the data. In a variation of such an embodiment, the customer may ensure that the data is encrypted by the enclave 712 by specifying, for example through an application programming interface call, that the data should pass through an enclave 712 configured for encrypting the data in this manner before being stored to the data store. In another variation of said embodiments, instructions executed within the enclave 712 by a processor may encrypt data by default unless the customer specifies that the data not be encrypted before storing in the data store.

Figure 8:
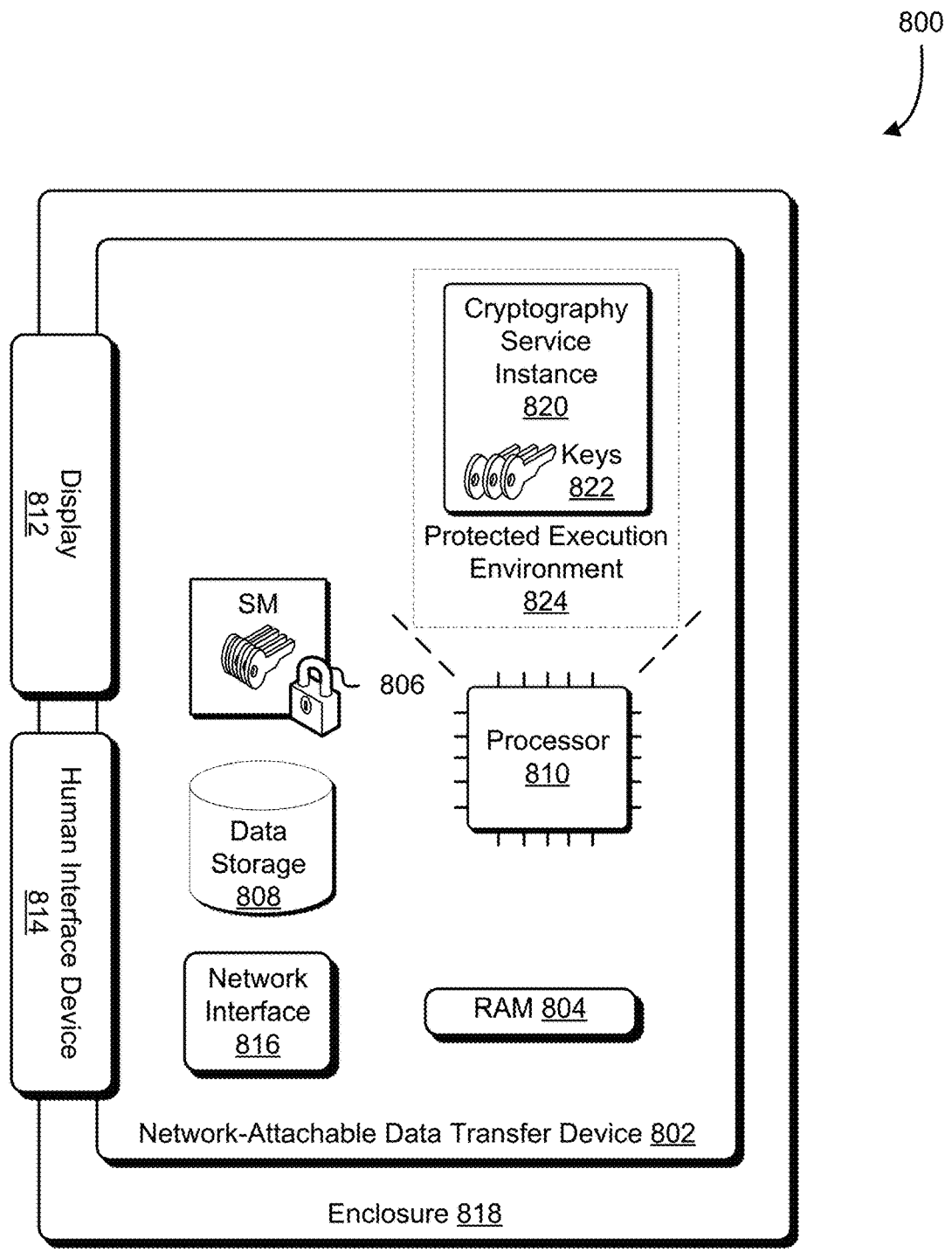
FIG. 8 shows an illustrative example of network-attachable data transfer devices in accordance with various embodiments.

FIG. 8 illustrates a diagram 800 of a network-attachable data transfer device 802 and components that may be included therein. The diagram 800 illustrates various components and modules that may be included in a network-attachable data transfer device. The network-attachable data transfer device 802 shown in FIG. 8 may be in accordance with those described elsewhere in this disclosure. The devices may be configured with fewer or additional components and/or modules. Some components and/or modules may be replaced by other suitable components and/or modules. An example of a network-attachable data transfer device 802 may include components such as, but not limited to: random access memory (RAM) 804; security module (SM) 806; persistent data storage 808; a processor 810; an electronic display 812; a human interface device 814; and a network interface 816. The network-attachable data transfer device may be enclosed in a tamper-proof enclosure 818.

A network-attachable data transfer device 802 may be configured to have volatile memory such as RAM 804. Any suitable form of volatile memory may be used in place of and/or in addition to RAM, such as registers, caches, and other types of temporary storage. In some embodiments, the contents stored in volatile memory such as RAM 804 are erased as a result of the network-attachable data transfer device 802 losing power (e.g., the device rebooting as a result of a loss of power, even temporary). Data stored in volatile memory may be maintained based at least in part on the device maintaining power—the data may be lost when the device loses power even, in some cases, as a result of temporary and/or intermittent power loss of the device.

A network-attachable data transfer device 802 may be configured with one or more security modules such as the security module 806 in FIG. 8. A security module may be a trusted platform module (TPM), physically unclonable function (PUF), hardware security module (HSM), and the like. In some embodiments, a security module is a physical computing device that safeguards cryptographic keys by storing them within a tamper-resistant physical device. Security modules may be used for cryptographic key generation and storage, and to perform cryptographic operations for authorized clients of the security module. In general, the cryptographic keys are not exportable from the security module in an unprotected form. In some embodiments, a security module is configured to perform a cryptographic operation such that an input value and an output value have different fixed sizes. For example, where the cryptographic operation is an encryption operation, the input plaintext may be of a first fixed size (e.g., 254 bytes) and may generate an output ciphertext that is of a second fixed size (e.g., 812 bytes). Conversely, a decryption operation may accept an input ciphertext that is 812 bytes in size and generate a corresponding output plaintext that is 254 bytes in size. A security module may be configured to perform various types of cryptographic operations such as encrypting data, decrypting data, verifying authenticity of data, and more. Encryption and decryption operations may be extended to support authenticated encryption and authenticated decryption, respectively. A security module that has been tampered with or been subject to an attempted tampering may be unable to perform cryptographic operations. In some embodiments, a network-attachable data transfer device may have multiple motherboards each having a security module that is used to encrypt a part of a cryptographic key.

In some embodiments, the network-attachable data transfer device 802 is further configured with one or more persistent data storage 808 components. Persistent data storage media may include non-volatile storage such as hard drives, tape drives, magnetic drives, non-volatile flash memory, and the like. A persistent storage medium may be configured to store large amounts of encrypted data (e.g., from a large data store such as a customer storage system) during shipment from one data facility to another data facility. In some embodiments, the network-attachable data transfer device 802 receives the data to be stored via a network connection accessible through the enclosure 818 and configured to provide access to the persistent storage medium as a network-attached storage device. In some examples, the network-attachable data transfer device 802 receives the data to be store from another cluster device via a communication session such as a cryptographically protected communication session (e.g., TLS session). In some embodiments, the persistent data storage 808 is configured to operate in connection with the persistent data storage of other network-attachable data transfer devices in a cluster. For example, in some embodiments, data is striped (e.g., in a RAID 0 configuration) between persistent storage media across multiple media within and/or across multiple network-attachable data transfer devices of a cluster. As a second example, data may be mirrored (e.g., in a RAID 1 configuration) between persistent storage media across multiple media within and/or across multiple network-attachable data transfer devices of a cluster. Data may be organized and/or partitioned in various ways—for example, each persistent storage medium may be used to store a database shard of a database.

A network-attachable data transfer device 802 may have one or more processors 810 such as central processing units (CPUs) that may be configured to perform cryptographic operations. In some embodiments, a network-attachable data transfer device 802 has one or more motherboards that are each configured with one or more processing units such as the processor 810 illustrated in FIG. 8. Furthermore, in some embodiments, each of the motherboards includes at least one security module. The processor 810 may protect an area in memory space of memory of the network-attachable data transfer device 802. The protected area, which may be referred to as an enclave or protected execution environment, may be utilized to perform various cryptographic operations. The processor 810 may obtain executable code for provisioning a protected execution environment 824 comprising a cryptography service instance 820 with keys 822, and execute the executable code. The processor 810 may manage the protected execution environment 824 comprising the cryptography service instance 820 with the keys 822, in which the cryptography service instance 820 may perform cryptographic operations using the keys 822. The network-attachable data transfer device 802 may obtain requests for cryptographic operations to be performed and fulfill the requests in the protected execution environment 824 using the cryptography service instance 820.

The network-attachable data transfer device 802 may also include an outward-facing electronic display 812. The electronic display may be used to display a destination location (e.g., in lieu of a shipping label). The display 812 may incorporate various types of display technologies such as low-power electronic-ink (e-ink), organic light emitting diodes (OLED), active-matrix organic light-emitting diode (AMOLED), flexible displays, and other such technologies. The display may further be a touch-screen display that a customer may interact with using a finger, stylus, or other input device. The network-attachable data transfer device 802 may be configured with multiple displays using multiple display technologies. The display may be visible to a customer, postal employee, etc. through the protective exterior enclosure 818.

A human interface device (HID) 814 may also be included as part of a network-attachable data transfer device 802. The human interface device 814 may be used to unlock the device—for example, a customer may unlock a device by: entering a password into an alphanumeric keyboard or display device (e.g., touchscreen); entering a personal identification number (PIN) or unlock code; performing a biometric verification using, for example, speech, fingerprint, and/or iris recognition using one or more sensors. Embodiments in accordance with this disclosure may use any combination of the techniques described herein as part of a process for unlocking a network-attachable data transfer device 802. A touchscreen display may be a human interface device. A locked network-attachable data transfer device may receive the verification data (password, PIN code, fingerprint data, etc.), perform an authentication process (e.g., verify that the provided password matches the user account associated with the device and/or unlock), and then unlock the device. The verification data may be used as part of a decryption process where an encrypted cluster manifest is decrypted and made available for use by the system.

The network-attachable data transfer device 802 may further include a network interface 816. The network interface may be used as an interface between an external network (e.g., a computer network or a service provider network) and the network-attachable data transfer device 802. In some embodiments, the network interface is used to communicate with other devices of a cluster in an ad-hoc manner—for example, various types of decentralized ad hoc networks. In some embodiments, the network interface uses a wireless interface such as a Wi-Fi network or a cellular network.

The network-attachable data transfer device 802 may have a tamper-proof enclosure 818 that acts as an enclosure to protect the device from being physically tampered with. The enclosure may be used to physically deny access to various internal components and modules such as RAM, security modules, one or more persistent storage media, and processing units, network interfaces, data stored on any of the above components, and more. In some embodiments, the enclosure 818 is made of hardened materials and may be ruggedized in accordance with one or more military standards and/or electronics industry standards. The enclosure may prevent access to internal components while simultaneously allowing access to other components, such as a display and/or human interface device that a customer may interact with. The enclosure 818 may have sensors for detecting kinetics to detect physical treatment of the device, such as sensors for measuring force, accelerometers, gyroscopes, etc. The enclosure may further be equipped with CPU and/or memory to monitor sensors. Conditions detected by the enclosure may cause the system to enter a locked state—for example, detection of the device being subject to strong forces may indicate an attempt to tamper with the device (e.g., by breaking open the enclosure to access internal components).

While various components of a network-attachable data transfer device have been illustrated in FIG. 8, the network-attachable data transfer device may be configured with various components added, removed, modified, or some combination thereof. For example, a network-attachable data transfer device may further include geolocation sensors such as a global positioning system (GPS) receiver that may be used as part of determining a shipping address to display. The GPS receiver may also be used to lock the device if it is determined the device is not in an expected geolocation or that the device is not within a prescribed distance from an expected path that the shipment of the device is expected to take.

In some embodiments, the network-attachable data transfer device includes ports and other peripheral connectors that may allow for additional functionality. For example, peripherals may be attached to the network-attachable data transfer device via a hardware attachment port such as a universal serial bus (USB) that may be accessible through the enclosure 818. In some embodiments, the system supports USB-pluggable security devices such as a portable hardware authentication device that may function as a security module. For example, in some cases, a portable hardware authentication device may be used to decrypt a partition of an encrypted data entry as part of the process for obtaining a cryptographic key encoded in the encrypted data entry. In this way, possession of a portable hardware authentication device may be required to obtain a cryptographic key from an encrypted data entry and/or obtain access to the decrypted contents of an encrypted payload.

Figure 9:
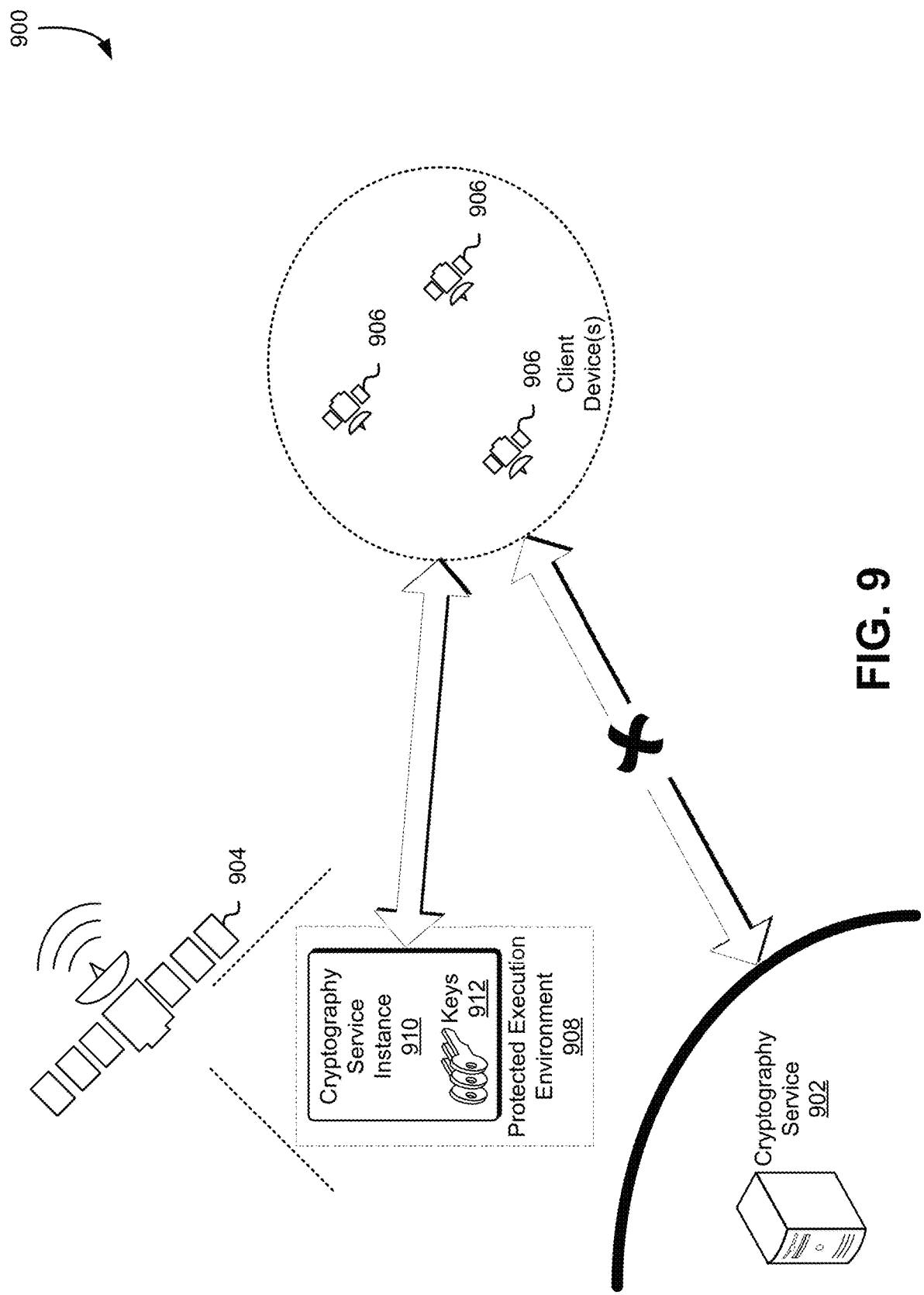
FIG. 9 shows an example environment in which cryptographic operations are performed.

FIG. 9 shows an example environment 900 in which cryptographic operations are performed. The environment 900 includes a cryptography service 902, edge device 904, client device(s) 906, and a protected execution environment 908 comprising a cryptography service instance 910 with keys 912.

Environment 900 may be an edge environment with limited connectivity to one or more wide area and global networks, such as the Internet. Environment 900 may be an outer space environment. In environment 900, the cryptography service 902 may be inaccessible and/or it may be impractical to communicate with ground-based cryptography services due to unreliability of networks, network latencies, network throughput, or various combinations of such factors or additional other factors. A cryptography service 902 may not be available through any networks in environment 900. Client device(s) 906 may be unable to access cryptography service 902 through any networks. Client device(s) 906 may be devices operated by clients in environment 900. Client device(s) 906 may include various computing devices, which may be part of one or more systems such as a space satellite, robot, or other outer space system. Clients may perform various cryptographic operations. Client device(s) 906 may be unable to submit requests to the cryptography service 902 to perform the various cryptographic operations. Client device(s) 906 may have access to the edge device 904 through one or more local networks.

Edge device 904 may be a computing device part of one or more systems such as a space satellite, robot, or other outer space system. Edge device 904 may comprise one or more processors that may protect areas in memory space of memory of the edge device 904. The protected areas may be utilized to perform various cryptographic operations. Edge device 904 may obtain executable code for provisioning a protected execution environment 908 comprising a cryptography service instance 910 with keys 912, and execute the executable code. One or more processors of edge device 904 may manage the protected execution environment 908 comprising the cryptography service instance 910 with the keys 912, in which the cryptography service instance 910 may perform cryptographic operations using the keys 912. Edge device 904 may obtain requests for cryptographic operations to be performed from client device(s) 906 and fulfill the requests in the protected execution environment 908 using the cryptography service instance 910.

Figure 10:
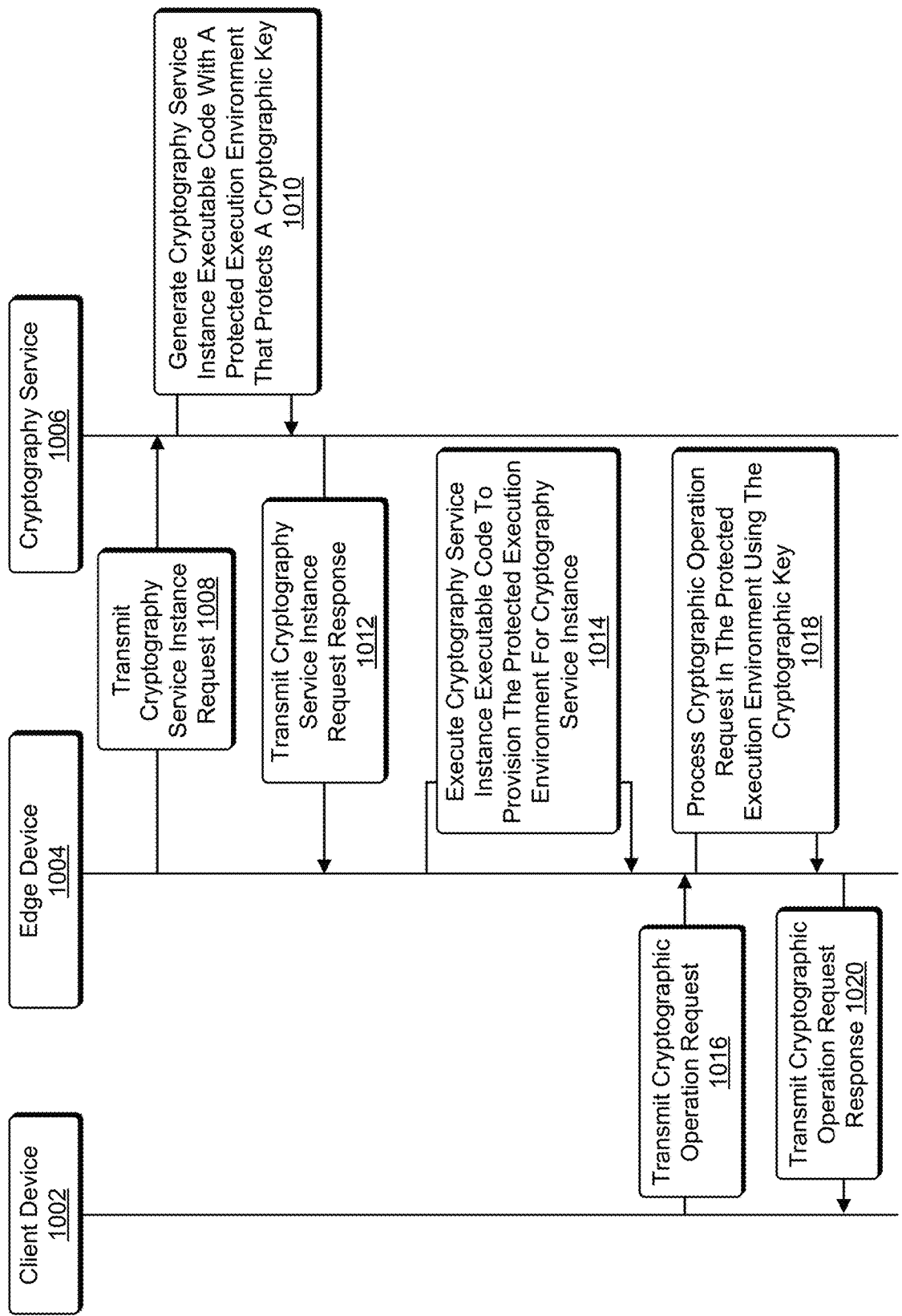
FIG. 10 illustrates a swim diagram of a process to provision a protected execution environment and perform cryptographic operations.

FIG. 10 illustrates a swim diagram of a process 1000 to provision a protected execution environment and perform cryptographic operations. Some or all of process 1000 (or any other processes described herein, or variations and/or combinations thereof) may be performed under control of one or more computer systems configured with computer-executable instructions and may be implemented as code (e.g., computer-executable instructions, one or more computer programs, or one or more applications) executing collectively on one or more processors, by hardware, software, or combinations thereof. Code may be stored on a computer-readable storage medium in form of a computer program comprising a plurality of computer-readable instructions executable by one or more processors. A computer-readable storage medium may be a non-transitory computer-readable medium. At least some computer-readable instructions usable to perform process 1000 may not be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, process 1000 is performed at least in part on a computer system such as those described elsewhere in this disclosure. Client device 1002, edge device 1004, and cryptography service 1006 may be implemented in accordance with those described elsewhere in this disclosure, such as those discussed in connection with FIG. 1.

The edge device 1004 may include executable code to at least transmit 1008 a cryptography service instance request to the cryptography service 1006. In some examples, a client that is an administrative device transmits a cryptography service instance request to the cryptography service 1006. In an embodiment, a client, which is not necessarily operating in an edge environment, transmits a cryptography service instance request to the cryptography service 1006 and causes cryptography service instance executable code to be provided and/or transmitted to the edge device 1004. The cryptography service instance request may be formatted as a web service API request. The cryptography service instance request may indicate one or more cryptographic keys, which may be managed by the cryptography service 1006. In some examples, the cryptography service instance request may comprise one or more encrypted cryptographic keys. The cryptography service 1006 may obtain the cryptography service instance request through one or more interfaces, such as a web service interface.

The cryptography service 1006 may include executable code to at least generate 1010 a cryptography service instance executable code with a protected execution environment that protects a cryptographic key. The cryptography service instance executable code may be code that, when executed by a computing device, causes the computing device to provision the protected execution environment comprising a cryptography service instance that can perform cryptographic operations with the cryptographic key. The cryptographic key may be a key indicated in the obtained cryptography service instance request. In some examples, the cryptographic key may be a key obtained from the obtained cryptography service instance request. The cryptography service 1006 may include executable code to at least transmit 1012 a cryptography service instance request response. The cryptography service instance request response may comprise the generated cryptography service instance executable code and the cryptographic key, which may be encrypted. In some examples, the cryptographic key may be encrypted within the cryptography service instance executable code, or provided separately as part of the cryptography service instance request response.

The edge device 1004 may obtain the cryptography service instance request response. In some examples, the edge device 1004 is provided with the cryptography service instance request response from the cryptography service 1006 as a result of one or more requests for cryptography service instances from one or more clients that may not be operating in an edge environment of the edge device 1004. The edge device 1004 may include executable code to at least execute 1014 the cryptography service instance executable code to provision the protected execution environment for a cryptography service instance. The edge device 1004 may execute the cryptography service instance code using one or more processors of the edge device 1004. The cryptography service instance executable code may cause the edge device 1004 to provision the protected execution environment with the cryptography service instance that can perform cryptographic operations with the cryptographic key. The cryptography service instance may perform various cryptographic operations in the protected execution environment using the cryptographic key.

The client device 1002 may include executable code to at least transmit 1016 a cryptographic operation request. The cryptographic operation request may be formatted as a web service API request. In some examples, the client device 1002 may only have access to the edge device 1004 and not have access to the cryptography service 1006. The client device 1002 may configure one or more network configurations of the client device 1002 to cause the cryptographic operation request to be transmitted to the edge device 1004. The client device 1002 may perform one or more network configuration actions in connection with various local network services, DNS services, and the like to cause the cryptographic operation request to be transmitted to a network location of the edge device 1004 instead of a network location of the cryptography service 1006. The client device 1002 may transmit the cryptographic operation request to the edge device 1004 through one or more local networks.

The edge device 1004 may obtain the cryptographic operation request. The edge device 1004 may include executable code to at least process 1018 the cryptographic operation request in the protected execution environment using the cryptographic key. The edge device 1004 may access one or more entry points to the protected execution environment to cause the cryptography service instance to perform one or more cryptographic operations of the cryptographic operation request. The cryptography service instance may use the cryptographic key to perform the one or more cryptographic operations, and provide results of the one or more cryptographic operations from the protected execution environment.

The edge device 1004 may include executable code to at least transmit 1020 a cryptographic operation request response to the client device 1002. The cryptographic operation request response may comprise the results of the one or more cryptographic operations from the protected execution environment. The edge device 1004 may obtain the results of the one or more cryptographic operations from the protected execution environment, and generate the cryptographic operation request response comprising the results. The cryptographic operation request response may be transmitted to the client device 1002 from the edge device 1004 through one or more local networks.

Figure 11:
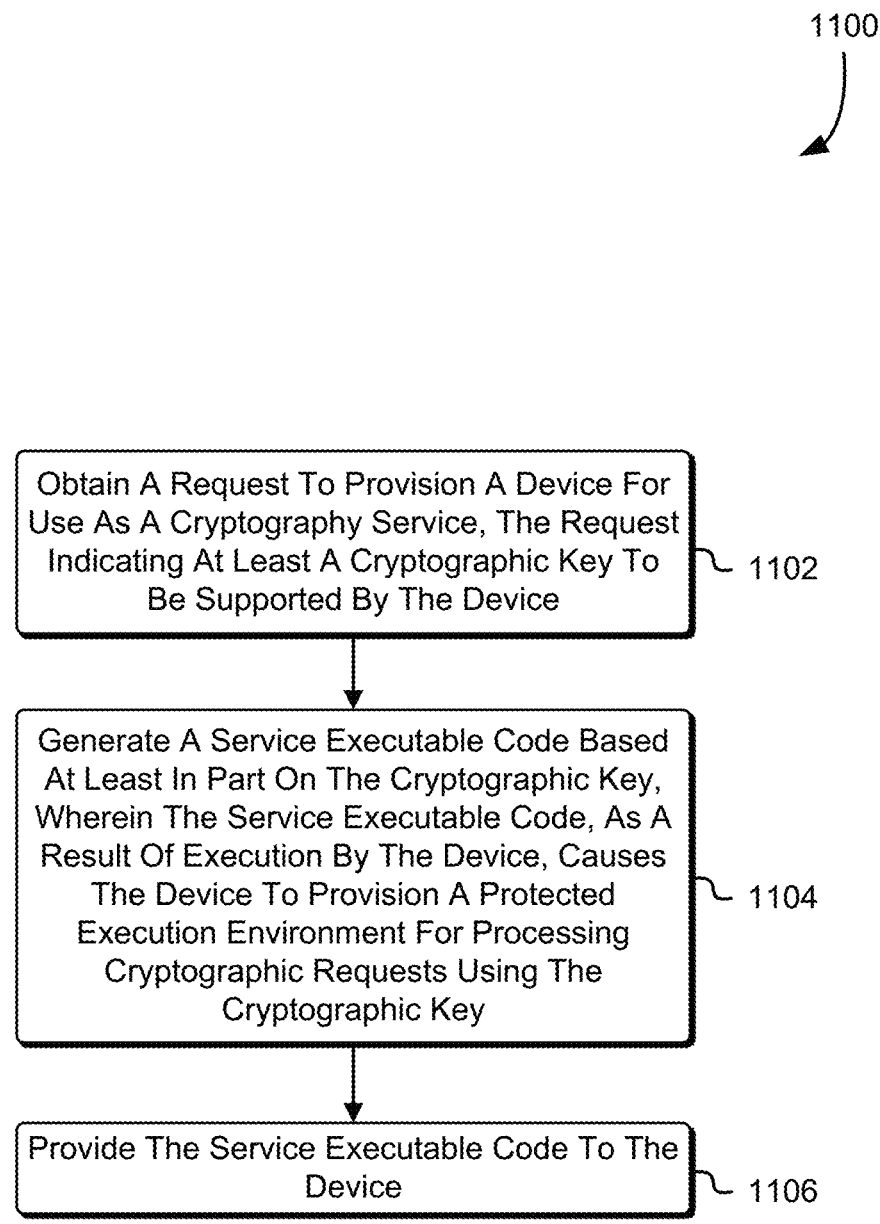
FIG. 11 shows an illustrative example of a process to generate and provide service executable code.

FIG. 11 shows an illustrative example of a process 1100 to generate and provide service executable code. Some or all of process 1100 (or any other processes described herein, or variations and/or combinations thereof) may be performed under control of one or more computer systems configured with computer-executable instructions and may be implemented as code (e.g., computer-executable instructions, one or more computer programs, or one or more applications) executing collectively on one or more processors, by hardware, software, or combinations thereof. Code may be stored on a computer-readable storage medium in form of a computer program comprising a plurality of computer-readable instructions executable by one or more processors. A computer-readable storage medium may be a non-transitory computer-readable medium. At least some computer-readable instructions usable to perform process 1100 may not be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, process 1100 is performed at least in part on a computer system such as those described elsewhere in this disclosure. The process 1100 may be performed by various suitable cryptography services described throughout this disclosure, such as cryptography services described in connection with FIG. 1.

A system performing at least a part of the process 1100 includes executable code to at least obtain 1102 a request to provision a device for use as a cryptography service, the request indicating at least a cryptographic key to be supported by the device, in at least one embodiment. The request may comprise an identifier of the cryptographic key. In some examples, the request may comprise the cryptographic key, which may be encrypted. The request may be a web service API request and may be submitted from the device, or other computing device associated with the device. The request may be a provisioning request for executable code such as those described in connection with FIG. 1.

A system performing at least a part of the process 1100 includes executable code to at least generate 1104 a service executable code based at least in part on the cryptographic key, wherein the service executable code, as a result of execution by the device, causes the device to provision a protected execution environment for processing cryptographic requests using the cryptographic key, in accordance with at least one embodiment. The system may generate the service executable code, which may be referred to as executable code, cryptography service instance executable code, update code, and/or variations thereof, based at least in part on the cryptographic key.

A system may generate service executable code by obtaining the cryptographic key. In some embodiments, the request may indicate one or more identifiers of the cryptographic key, in which the system may obtain the cryptographic key from one or more secure devices, such as one or more HSMs. In some embodiments, the request may comprise an encrypted key. The system may obtain an encrypted key from a different request or communication from the device. The encrypted key may be encrypted with a key associated with the system. The system may decrypt the encrypted key to obtain the cryptographic key. In some examples, the encrypted key may be encrypted with a public key of the system, in which the system may decrypt the encrypted key using a private key of the system. In some examples, the encrypted key may be encrypted with a symmetric key, which may be obtained through one or more key exchange processes with the device, in which the system may decrypt the encrypted key using the symmetric key.

A system may generate service executable code based at least in part on the cryptographic key. The system may determine one or more cryptographic processes, operations, and functions that the device may perform using the cryptographic key, and generate code for a cryptography service instance that may, when executed, perform the one or more cryptographic processes, operations, and functions using the cryptographic key. The system may encode the cryptographic key in encrypted form in the service executable code. The system may generate code of the service executable code, which may be referred to as trusted code, that when executed, provisions a protected execution environment comprising a cryptography service instance that may perform various cryptographic processes, operations, and functions using the cryptographic key. The system may generate code of the service executable code, which may be referred to as untrusted code, that when executed, instantiates a routing service, which may be a software application or program that may provide access to the protected execution environment as well as cause the cryptography service instance to perform various cryptographic processes, operations, and functions using the cryptographic key.

A system performing at least a part of the process 1100 includes executable code to at least provide 1106 the service executable code to the device. The service executable code may be provided to the device in response to the request. In some examples, the service executable code may be provided to the device through one or more networks, which may be cryptographically secured. In some examples, the system may obtain the device and transfer the service executable code locally to the device through one or more data transfer operations. The one or more data transfer operations may utilize one or more physical interfaces of the device to transfer the service executable code. The system may provide the cryptographic key encrypted within the service executable code, or separate from the service executable code. The device may obtain the service executable code and execute the service executable code.

Figure 12:
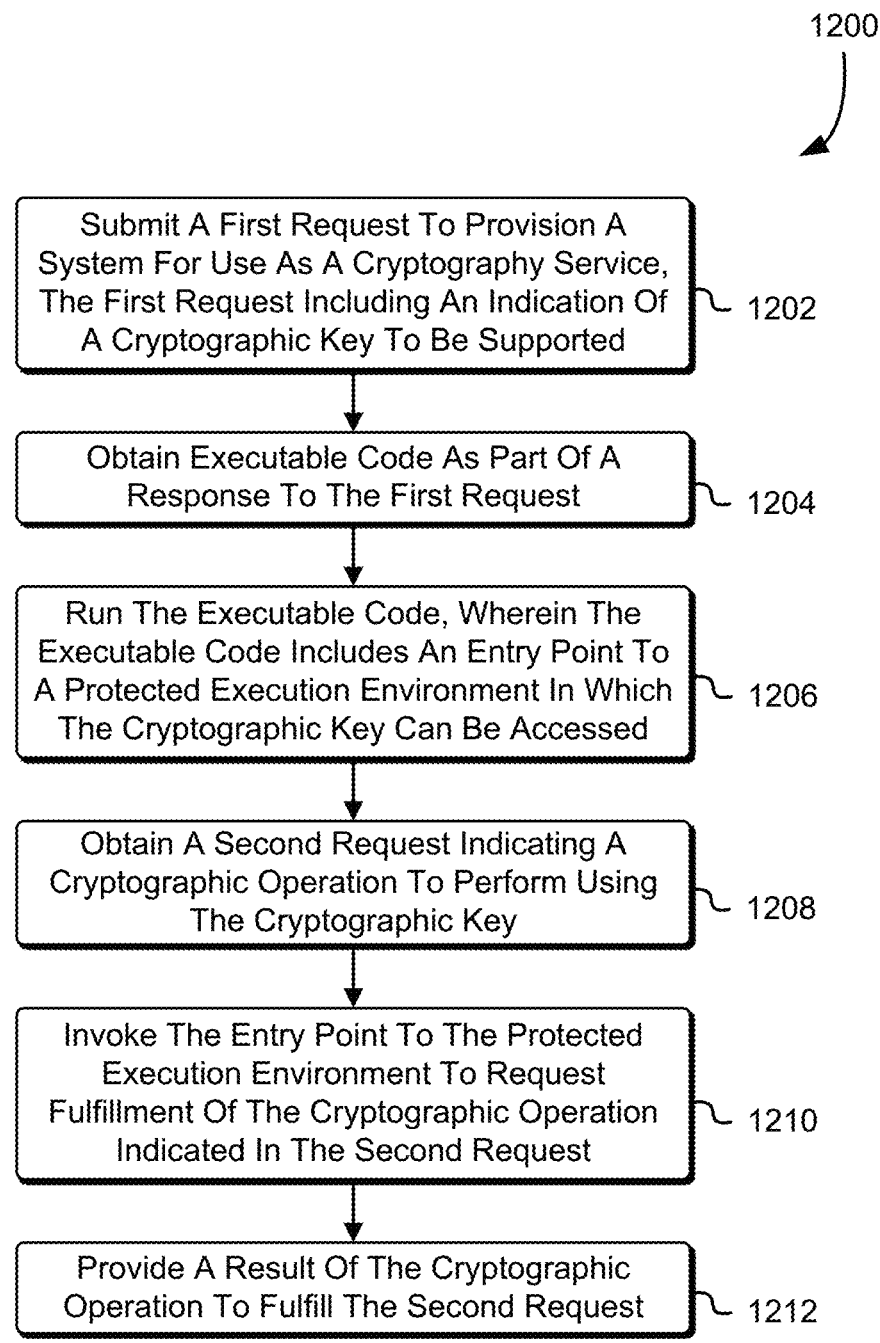
FIG. 12 shows an illustrative example of a process to obtain and execute code for processing cryptographic operations.

FIG. 12 shows an illustrative example of a process 1200 to obtain and execute code for processing cryptographic operations. Some or all of process 1200 (or any other processes described herein, or variations and/or combinations thereof) may be performed under control of one or more computer systems configured with computer-executable instructions and may be implemented as code (e.g., computer-executable instructions, one or more computer programs, or one or more applications) executing collectively on one or more processors, by hardware, software, or combinations thereof. Code may be stored on a computer-readable storage medium in form of a computer program comprising a plurality of computer-readable instructions executable by one or more processors. A computer-readable storage medium may be a non-transitory computer-readable medium. At least some computer-readable instructions usable to perform process 1200 may not be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, process 1200 is performed at least in part on a computer system such as those described elsewhere in this disclosure. The process 1200 may be performed by an edge device, such as an edge device 110 as described in connection with FIG. 1.

The system performing at least a part of the process 1200 includes executable code to at least submit 1202 a first request to provision a system for use as a cryptography service, the first request including an indication of a cryptographic key to be supported. The first request may be submitted as a web service API request to a cryptography service provided by a computing resource services provider. The first request may comprise an identifier of the cryptographic key. In some examples, the first request may comprise the cryptographic key, which may be encrypted. In some embodiments, the system may encrypt the cryptographic key and provide it to the cryptography service separately from the first request.

The system performing at least a part of the process 1200 includes executable code to at least obtain 1204 executable code in response to the first request. The system may obtain the executable code from the cryptography service provided by the computing resource services provider. The executable code may be code that, when executed by the system, causes the system to provision a protected execution environment comprising a cryptography service instance that can perform cryptographic operations with the cryptographic key.

The system performing at least a part of the process 1200 includes executable code to at least run 1206 the executable code, wherein the executable code includes an entry point to a protected execution environment in which the cryptographic key can be accessed. The system may run, install, or otherwise execute the executable code. The executable code may cause the system to provision the protected execution environment comprising a cryptography service instance that can perform cryptographic operations with the cryptographic key within memory of the system. Further information regarding a protected execution environment can be found in the description of FIG. 7. The cryptography service instance of the protected execution environment may be accessible through the entry point, which may comprise one or more functions that provide access to the protected execution environment.

The system performing at least a part of the process 1200 includes executable code to at least obtain 1208 a second request indicating a cryptographic operation to perform using the cryptographic key. The system may obtain the second request through one or more networks, such as a local area network. The system may obtain the second request from a device operating in an environment comprising the system. The second request may indicate the cryptographic operation, as well as aspects of the cryptographic operation (e.g., data to be encrypted, decrypted, or otherwise cryptographically processed). The system performing at least a part of the process 1200 includes executable code to at least invoke 1210 the entry point to the protected execution environment to request fulfillment of the cryptographic operation indicated in the second request. The system may provide data of the second request to the cryptography service instance through the entry point. The entry point may be a function that may pass data to the cryptography service instance of the protected execution environment. The system may utilize the entry point to cause the cryptography service instance to perform the cryptographic operation.

The system performing at least a part of the process 1200 includes executable code to at least provide 1212 a result of the cryptographic operation to fulfill the second request. The cryptographic operation may be performed by the cryptography service instance of the protected execution environment. The cryptography service instance may provide the result from the protected execution environment. The system may obtain the result and transmit the result in response to the second request. The system may transmit the result to the device that submitted the second request through one or more networks, such as a local area network.

Figure 13:
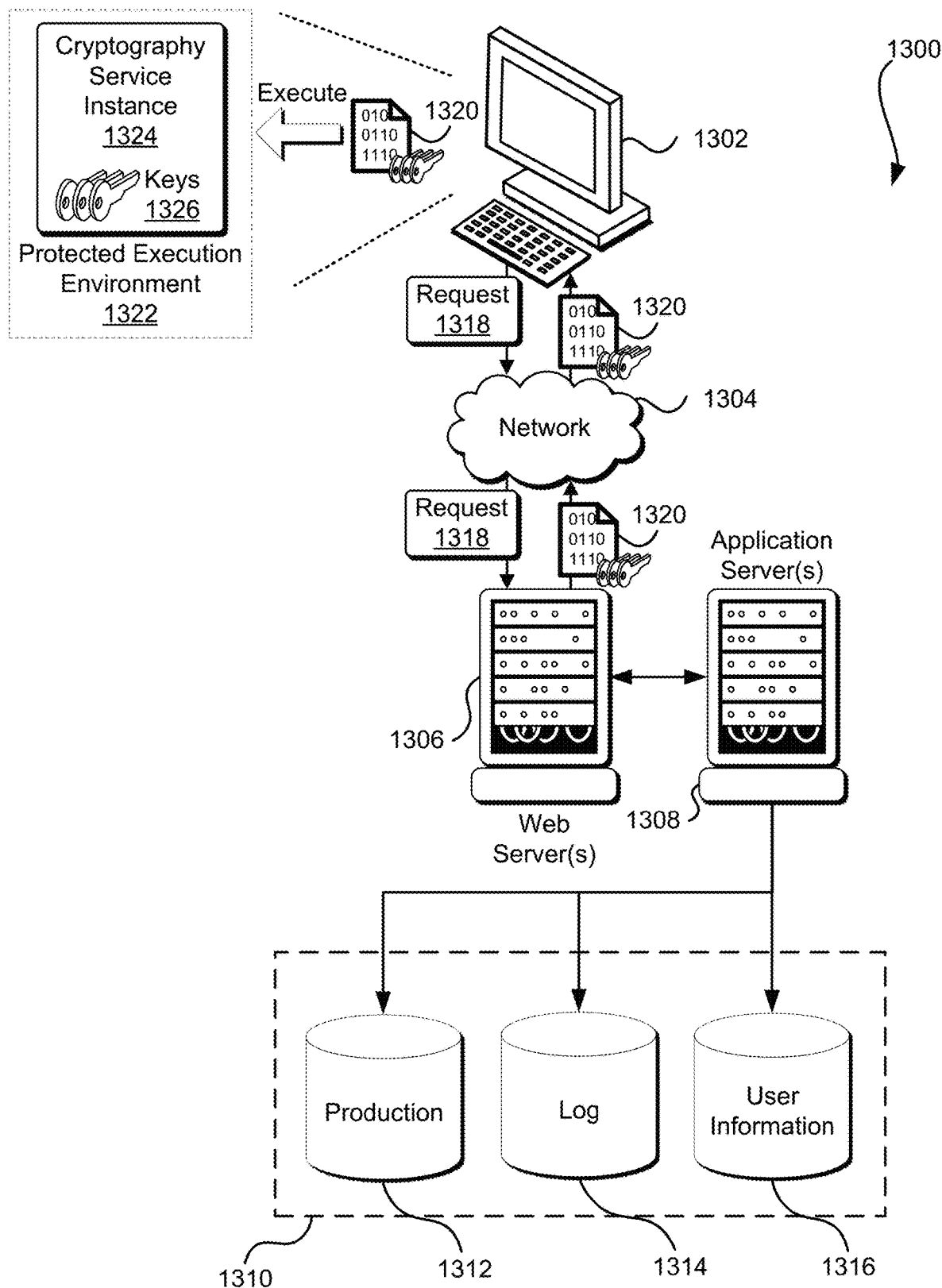
FIG. 13 illustrates a system in which various embodiments can be implemented.

FIG. 13 illustrates aspects of an example system 1300 for implementing aspects in accordance with an embodiment. As will be appreciated, although a web-based system is used for purposes of explanation, different systems may be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and a data store 1310, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1302 and the application server 1308, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1310, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1312 and user information 1316, which are used to serve content for the production side. The data store also is shown to include a mechanism for storing log data 1314, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1310.

The data store 1310, in an embodiment, is operable, through logic associated therewith, to receive instructions from the application server 1308 and obtain, update or otherwise process data in response thereto, and the application server 1308 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1302. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

The device 1302 may also submit a request 1318 to the web server 1306. The request 1318 may be a request for executable code as described in connection with FIG. 1. The request 1318 may indicate one or more cryptographic keys. The device 1302 may obtain executable code 1320 in response to the request 1318. The executable code 1320 may comprise instructions that, when executed by a device such as the device 1302, causes the device to provision a protected execution environment comprising a cryptography service instance that can perform cryptographic operations with the one or more cryptographic keys. The device 1302 may execute the executable code 1320 to provision a protected execution environment 1322 comprising a cryptography service instance 1324 that can perform cryptographic operations with the one or more cryptographic keys (e.g., keys 1326).

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1300, in an embodiment, is a distributed and/or virtual computing system utilizing several computer systems and components that are interconnected via communication links (e.g., transmission control protocol (TCP)

connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a cryptography service, a request to provision a computing device to perform one or more cryptographic operations, the request including an indication of a set of cryptographic keys to be supported;
   generating executable code that encodes a cryptographic key of the set of cryptographic keys in encrypted form;
   providing the executable code to the computing device;
   executing, at the computing device, the executable code, wherein access to the cryptographic key of the set of cryptographic keys is restricted to a protected execution environment of the computing device associated with the cryptographic key;
   obtaining, at the computing device, a cryptographic request submitted by a client, the cryptographic request comprising a key identifier of the cryptographic key; and
   fulfilling the cryptographic request by at least performing a cryptographic operation using the cryptographic key within the protected execution environment.

2. The computer-implemented method of claim 1, wherein generating the executable code based at least in part on the set of cryptographic keys further comprises:
   using the indication of the set of cryptographic keys to obtain the set of cryptographic keys;
   generating a trusted portion of the executable code, wherein the trusted portion of the executable code comprises:
      a set of entry points that can be invoked from an untrusted portion of the executable code; and
      a set of functions that, as a result of execution, perform a set of cryptographic operations using the set of cryptographic keys; and
   generating an untrusted portion of the executable code that, as a result of execution, invokes the set of entry points to fulfill requests to perform cryptographic operations.

3. The computer-implemented method of claim 1, wherein the protected execution environment is an enclave.

4. The computer-implemented method of claim 1, wherein the computing device obtains the cryptographic request through one or more local networks.

5. A system, comprising:
   one or more processors; and
   memory that stores computer-executable instructions that are executable by the one or more processors to cause the system to:
      obtain a request to provision a device for use as a cryptography service, the request indicating a first cryptographic key to be supported by the device;
      generate a service executable code based at least in part on the first cryptographic key, wherein the service executable code, as a result of being executed by the device, causes the device to provision a protected execution environment for processing cryptographic requests using the first cryptographic key, further wherein access to the first cryptographic key on the device is restricted to the protected execution environment;
      provide the service executable code to the device;
      detect occurrence of a key rotation indicating that the first cryptographic key has been updated to a second cryptographic key;
      generate an updated service executable code based at least in part on the second cryptographic key; and
      provide the updated service executable code to the device.

6. The system of claim 5, wherein the updated service executable code encodes at least the first cryptographic key and the second cryptographic key, and further wherein the first cryptographic key is usable for decryption requests and unusable for encryption requests.

7. The system of claim 5, wherein the cryptographic requests include at least:
   encryption requests;
   decryption requests; and
   cryptographic key generation requests.

8. The system of claim 5, wherein:
   the request comprises a ciphertext of the first cryptographic key; and
   the computer-executable instructions further include instructions that, as a result of execution by the one or more processors, cause the system to decrypt the ciphertext to obtain the first cryptographic key.

9. The system of claim 5, wherein the computer-executable instructions further include instructions that, as a result of execution by the one or more processors, cause the system to:
- obtain a second request, the second request indicating the second cryptographic key to be supported by the device;
- generate a second service executable code based at least in part on the second cryptographic key, wherein the second service executable code, as a result of being executed by the device, causes the device to provision a second protected execution environment for processing the cryptographic requests using the second cryptographic key, further wherein access to the second cryptographic key on the device is restricted to the second protected execution environment; and
- provide the second service executable code to the device.

10. The system of claim 9, wherein the second protected execution environment is usable in addition to the protected execution environment for processing the cryptographic requests.

11. The system of claim 5, wherein the service executable code comprises cryptographic material for authenticating the service executable code.

12. A non-transitory computer-readable storage medium storing thereon executable instructions that, as a result of being executed by one or more processors of a computer system, cause the computer system to:
- submit a first request to provision the computer system for use as a cryptography service, the first request including an indication of a first cryptographic key to be supported;
- obtain executable code as part of a response to the first request;
- run the executable code, wherein the executable code includes a first entry point to a protected execution environment in which the first cryptographic key can be accessed;
- obtain a second request indicating a cryptographic operation to perform using the first cryptographic key;
- invoke the first entry point to the protected execution environment to request fulfillment of the cryptographic operation indicated in the second request;
- provide a result of the cryptographic operation to fulfill the second request; and
- obtain a second executable code generated based at least in part on a second cryptographic key and the first cryptographic key.

13. The non-transitory computer-readable storage medium of claim 12, wherein the executable instructions further comprise instructions that, as a result of being executed by the one or more processors, cause the computer system to at least:
- run the second executable code, wherein the second executable code includes a second entry point to a second protected execution environment in which the second cryptographic key and the first cryptographic key can be accessed.

14. The non-transitory computer-readable storage medium of claim 13, wherein the instructions to run the second executable code further comprise instructions that, as a result of being executed by the one or more processors, cause the computer system to replace the first entry point with the second entry point.

15. The non-transitory computer-readable storage medium of claim 12, wherein the executable code includes a plurality of entry points to a plurality of protected execution environments.

16. The non-transitory computer-readable storage medium of claim 15, wherein the executable instructions further comprise instructions that, as a result of being executed by the one or more processors, cause the computer system to at least:
- obtain a third request indicating a second cryptographic operation to perform, the third request comprising a key identifier;
- identify a third entry point of the plurality of entry points based at least in part on the key identifier; and
- invoke the identified third entry point as part of fulfillment of the third request.

17. The non-transitory computer-readable storage medium of claim 12, wherein the executable instructions further comprise instructions that, as a result of being executed by the one or more processors, cause the computer system to at least:
- obtain a third executable code, wherein the third executable code indicates a third cryptographic key generated by a client; and
- run the third executable code, wherein the third executable code includes a third entry point to a third protected execution environment in which the third cryptographic key can be accessed.

18. The non-transitory computer-readable storage medium of claim 12, wherein the first entry point comprises one or more functions that provide access to the protected execution environment.

19. The non-transitory computer-readable storage medium of claim 12, wherein the computer system is an edge device.

* * * * *